Aug. 24, 1926. 1,596,926
F. M. FURBER
CUTTING MACHINE
Filed Oct. 30, 1922  9 Sheets-Sheet 1
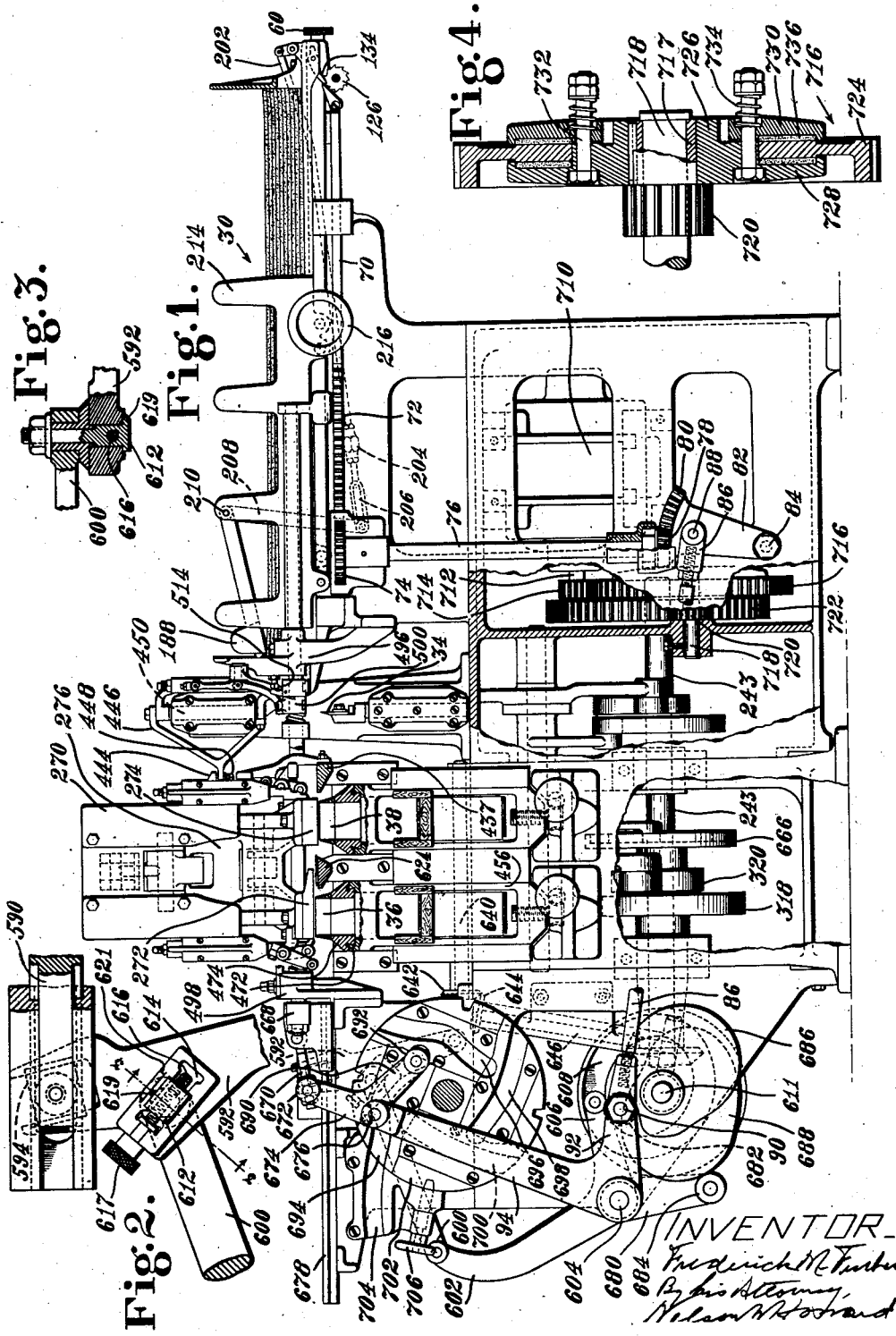

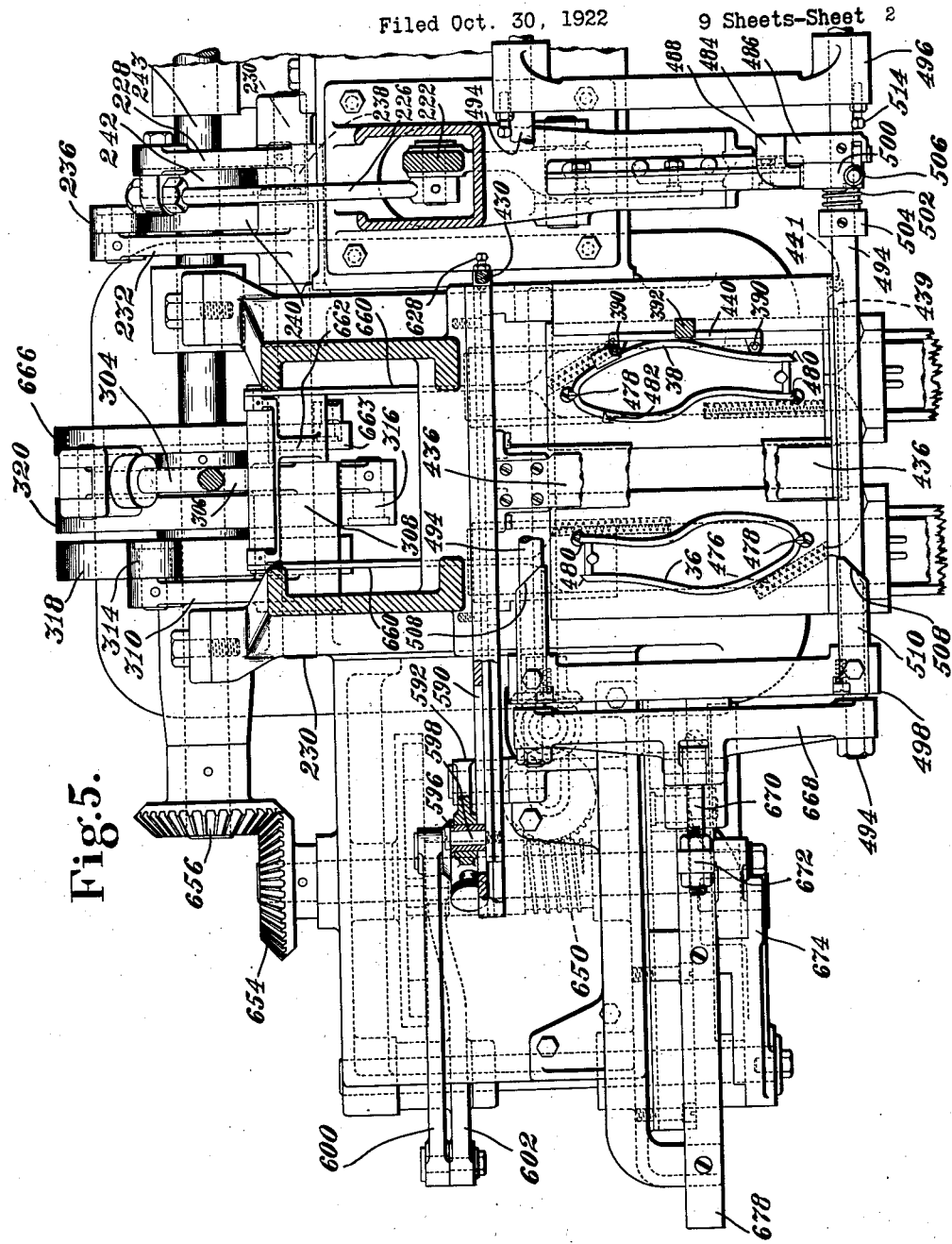

Aug. 24, 1926.

F. M. FURBER 1,596,926

CUTTING MACHINE

Filed Oct. 30, 1922

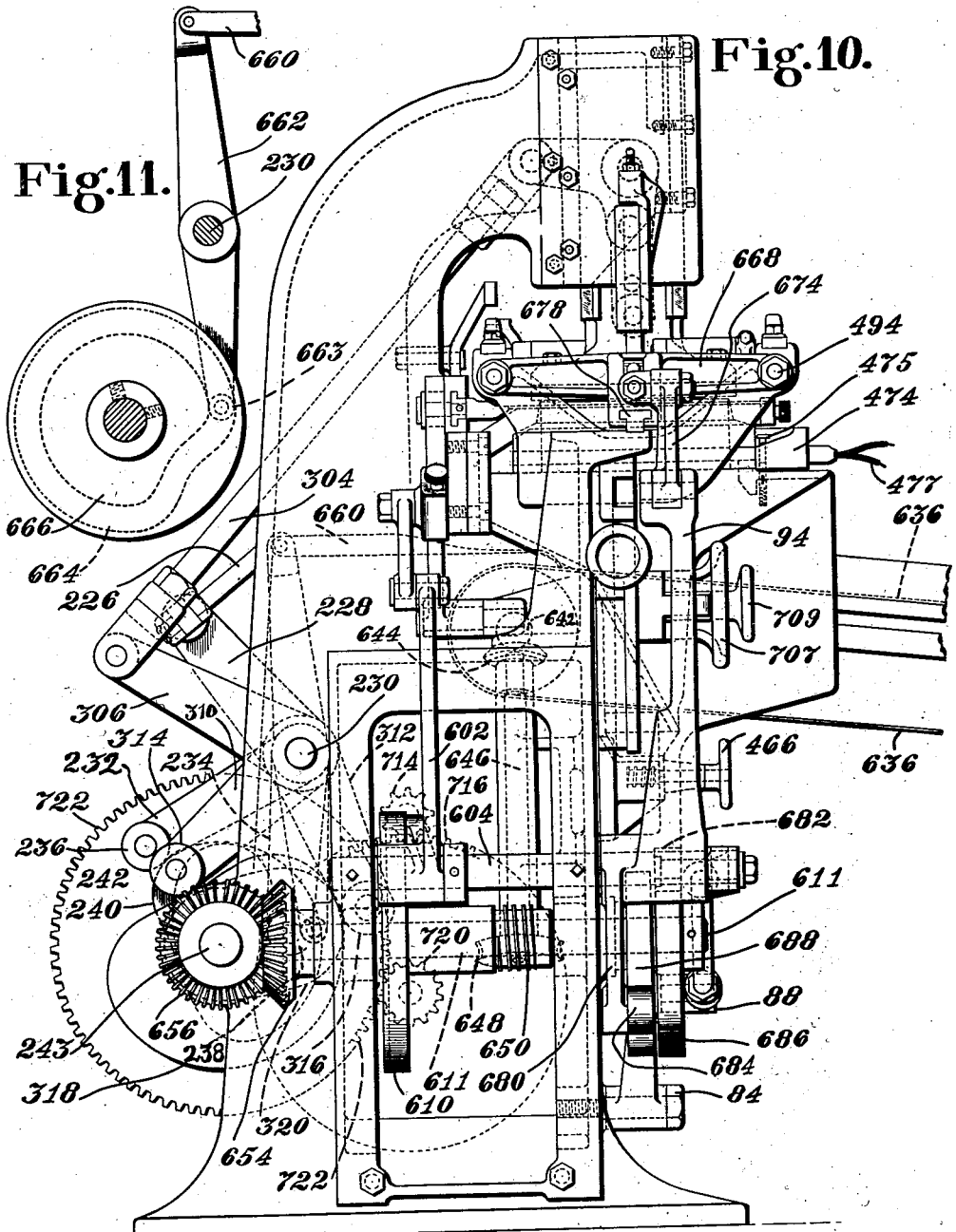

Aug. 24, 1926.

F. M. FURBER

CUTTING MACHINE

Filed Oct. 30, 1922

F. M. FURBER

CUTTING MACHINE

Filed Oct. 30, 1922

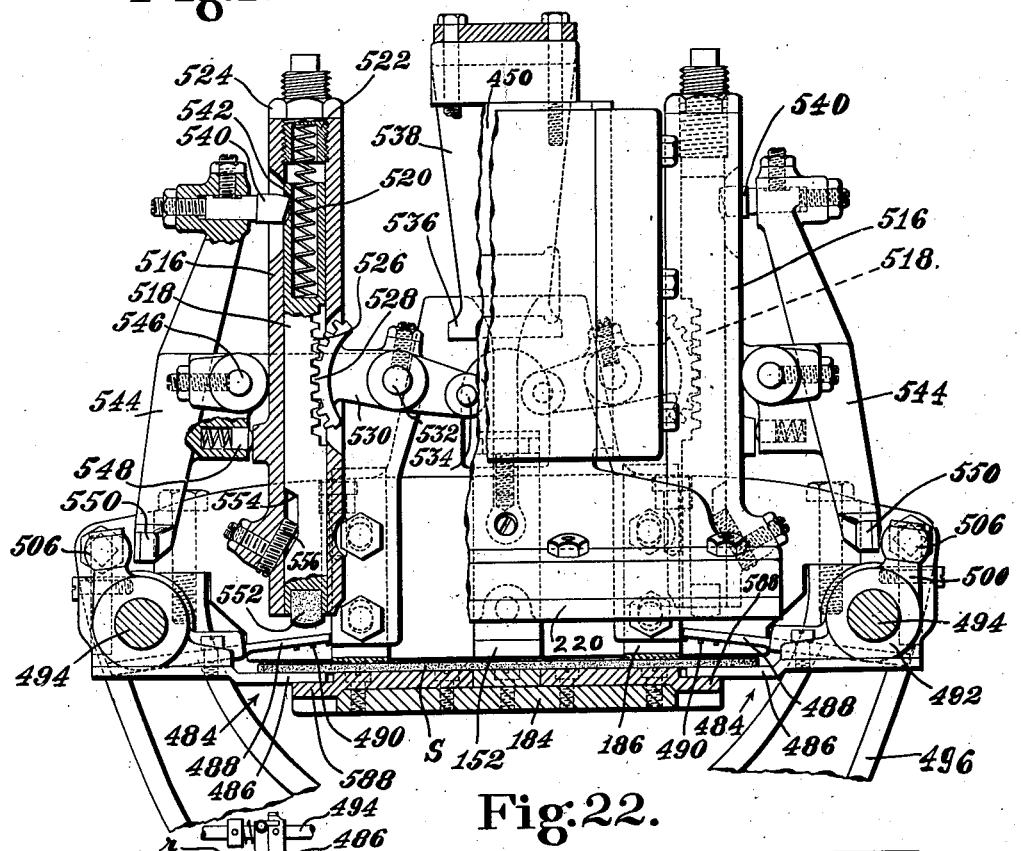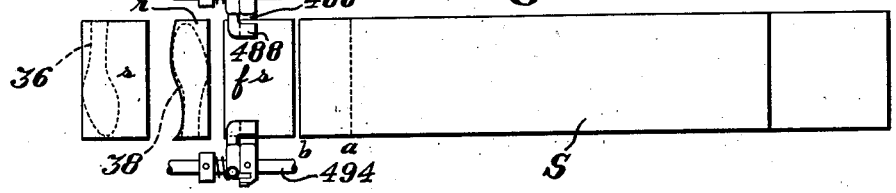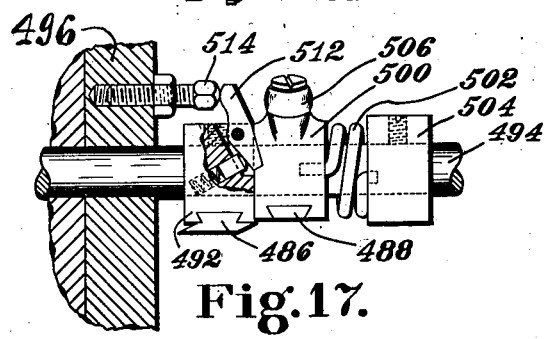

Aug. 24, 1926.

F. M. FURBER

CUTTING MACHINE

Filed Oct. 30, 1922    9 Sheets-Sheet 9

1,596,926

INVENTOR
Frederick M. Furber
By his Attorney
Nelson W. Howard

Patented Aug. 24, 1926.

1,596,926

UNITED STATES PATENT OFFICE.

FREDERICK M. FURBER, OF BEACHMONT, MASSACHUSETTS, ASSIGNOR TO UNITED SHOE MACHINERY CORPORATION, OF PATERSON, NEW JERSEY, A CORPORATION OF NEW JERSEY.

CUTTING MACHINE.

Application filed October 30, 1922. Serial No. 597,935.

This invention relates to the cutting of sheet material and, more particularly, to the economical production of blanks in quantity from sheet material.

It is an object of the invention to provide a machine for the cutting of blanks from sheet material especially adapted to the cutting of irregularly shaped blanks with the very minimum of waste. Another object of the invention is to provide a cutting machine of general utility which will be especially efficient in operation and require of the operator the minimum of attention, thus insuring time sufficient for the supplying of material to be operated upon and for the disposal of the finished product. It is a further object of the invention to provide an improved method of cutting blanks from sheet material.

In one aspect the invention comprises cutting sheet material into sections of predetermined size related definitely to the size of the blanks it is desired to obtain therefrom and subsequently cutting a blank from each of the sections and simultaneously therewith severing the section to provide material for another blank to be cut at a subsequent operation.

In another aspect the invention resides in cutting sheet material into sections with any waste or excess piece of a sheet of material, due to variations in length of sheets, located at the front end of the first section, and subsequently cutting blanks from the sections, the said waste or excess piece being disposed of at the time of cutting a blank from said first section.

In the illustrative machine sheets of material are fed to a cutting means to have sections cut therefrom which sections are presented subsequently first to one cutting means and then to another to have a plurality of blanks cut from each section. In the preferred construction the cutting means operate simultaneously to cut blanks from the sections. Conveniently, the blank cutting means are dies arranged in alinement with the direction of feed of the material. To insure perfect cutting and to prevent scrap from entering the dies, the sections are carried from the sheet cutting means first to the farther die and the portion of the section remaining after the cutting of the first blank is transferred back to the die nearer to the sheet cutting means to have a second blank cut therefrom.

From another viewpoint the invention comprises means for cutting sheets into sections and the sections into blanks in an organization in which provision is made for taking care of any excess piece or remnant at the forward end of the sheet at the time of operating upon the first section to cut a blank therefrom, means being also provided for removing any scrap piece or remnant at the rear end of each sheet from the path of the incoming sheet so that no scrap piece or remnant is allowed to interfere with or obstruct the proper operation of the blank cutting means. As shown, the last mentioned means comprises a piercing means associated with a cutter of the sheet cutting means to engage the scrap piece or remnant and withdraw it from the path of the sheet material so that the scrap piece cannot be advanced further into the machine by the advancing end of the succeeding sheet.

In the construction shown, a single feeding means is provided for feeding each sheet to the cutting means which severs the sheet into sections and for feeding the sections to the blank cutting means. Preferably, provision is made for cutting blanks through a range of sizes and to this end means is conveniently provided for accelerating the movement of the feeder member to feed the sheet in greater amounts to the sheet cutting means for the production of the larger sections, and for subsequently retarding the movement of the same feeder member so that it will position each section in proper relation to the blank cutting means which is always at a fixed distance from the sheet cutting means irrespective of the size of the blank to be cut from the section.

The invention contemplates the provision of improved means for feeding sheets of material toward the means for operating thereon, the said feeding means being reciprocable beneath the support for the sheets and automatically operative to engage a sheet to move the same once in a predetermined number of reciprocations of the feeding means. In the illustrative construction, means is provided under the control of the operator for determining the ratio of the operative to the inoperative movements of the reciprocable means for feeding the sheets over the support.

In a preferred form of the invention, a magazine is provided for the sheet material to be operated upon, the forward end of the magazine having an exit opening to permit of the passage of one or more sheets from the magazine. Since the cutting means for operating on the sheets is located at a predetermined distance from the front end of the magazine it is clear that any displacement of the lowermost sheet or sheets in a direction toward the cutting means would interfere with the proper positioning of the sheets relatively to the cutting means in the operation of the feeding means. Such displacement of the lowermost sheet or sheets might readily be caused by the introduction of other sheets into the top of the magazine, it being quite possible to shove the advance end of the lowermost sheet through the exit opening if only the lowermost sheet remains in the magazine at the time that a fresh supply of sheets is being introduced. Accordingly, means is provided for stopping the feeding of sheets from the bottom of the magazine when the supply in the magazine has been reduced to a predetermined minimum. It becomes necessary then for the operator to supply additional sheets so that the machine may continue to operate upon the material. Conveniently, the means just described is controlled through a member which rests on the top of the stack of sheets of the magazine, and comprises means which is operated to lift the rear ends of the sheets in the magazine upwardly away from the feed means, so that even though the latter continues to operate it must fail to feed a sheet when only the aforementioned minimum number of sheets is in the magazine.

In order to insure the proper feeding of the lowermost sheet in the magazine even though the forward end thereof should be folded, corrugated, curled upwardly or downwardly or otherwise distorted, there is provided at the exit opening a guiding means which will direct the advance end of the sheet to the exit opening. In the construction shown, this guiding means takes the form of flared portions on the lower end of the end wall of the magazine, and, preferably, also of correspondingly flared portions on the floor of the magazine adjacent to the exit opening. Preferably means is provided for pressing the sheet material down upon a high spot between the flared portions on the floor of the magazine adjacent to the exit opening, said means in the present case being a weighted member which is conveniently the stack-controlled element of the means for preventing feed of the material from the magazine when the sheets in the magazine have been reduced to a predetermined minimum, as above described.

A feature of importance in connection with the blank cutting means is the provision of mountings for all the different sizes of dies, the said mountings having portions of the same size to engage with the same positioning means on the frame of the machine, the upper ends of the mountings being of different sizes to accommodate their respective dies, which are attached thereto so that the die and its mounting are introduced into and removed from the machine as a unit. Conveniently also, the mountings and the dies are so constructed and arranged that the edge of the die more remote from the plane of the sheet cutting means is always located at the same predetermined distance therefrom irrespective of the size of the die. In connection with the dies, heating means is employed which, in the construction shown, comprises electrical heating units which may be pocketed in the holder or mounting for the die.

The invention contemplates also improved feeding means for the sheet material designed to insure that the feeding means will engage the material with sufficient firmness to feed the material invariably to the same position relative to the cutting means, the purpose being to cut from the sheet material sections of a certain predetermined size such that a blank or blanks may be cut from the sections with a minimum of waste. In the construction shown, the feeding means comprises gripper jaws which are spring operated to seize the material, additional means being employed to strike one or the other of the jaws or the material itself a smart blow, thus setting the jaws firmly upon the material.

An important feature of the feeding mechanism for the material resides in a construction wherein a reciprocable feeder member is movable across the plane of operation of the cutting means to seize the sheet to be fed and is then movable in the reverse direction to feed the sheet, thus providing a construction in which the feeding means feeds the sheet to the cutting means and the cut-off end or section to a discharge station, the advantage of the construction residing in the fact that the feeder member, having seized the advance end of the sheet, never relaxes its hold until the discharge station is reached, thereby maintaining constant control of the material and insuring against misplacement of the latter.

In the illustrative machine the cutting means for the sheet material comprises an intermittently operative cutter and hence the feeding means just described must come to a full stop or dwell while the cutting takes place. In arranging for the cutting of sections of different sizes in order to produce blanks of various sizes at the blank cutting station, the feeding means can be so operated as to vary the rate of feeding movement of the feeder member up to the time of the dwell, the said means comprising, in the construction shown, a rotatable cam wheel having a plurality of cam slots, any one of which may be positioned by the operator to have its effect upon the operating means for the reciprocable feeder member.

Further important features of the invention relate to improved means for holding the sectioned material in proper position over the dies, the said means co-operating with the feeding means to retain the material in the position to which it has been moved by the feeding means. Conveniently, therefore, the said positioning means is constructed and arranged in each instance to be controlled by the feeding means. In the construction shown, the positioning means for the sections of material comprises spring-pressed plungers which are locked in their raised positions and are tripped by the feeding means at the proper time to effect the holding of the material on the die.

Other novel features of construction and combinations of parts will be described in the specification and pointed out in the appended claims.

In the drawings:

Figure 1 is a view in front elevation of a machine showing one embodiment of the invention;

Figs. 2 and 3 are detail views of the operating means for one of the feeding mechanisms, Fig. 3 being a section taken along the line 3—3 of Fig. 2;

Fig. 4 is a detail sectional view of one of the gears of the driving means;

Fig. 5 is a horizontal, sectional view of part of the machine shown in Fig. 1, designed to show the dies in plan view;

Fig. 10 is a view in elevation of the left end of the machine shown in Fig. 1;

Fig. 11 is a detail of the operating means for the blank pushers or ejectors;

Fig. 16 is a vertical, transverse section of the machine shown in Fig. 1 at a point to the right of the cutters in the last-mentioned figure;

Fig. 17 is a detail view showing a part of the mechanism for feeding sections of the material and showing also the trip for the same;

Fig. 22 is a diagrammatic representation of the results of feeding and cutting operations on a sheet of material.

Figure 6:
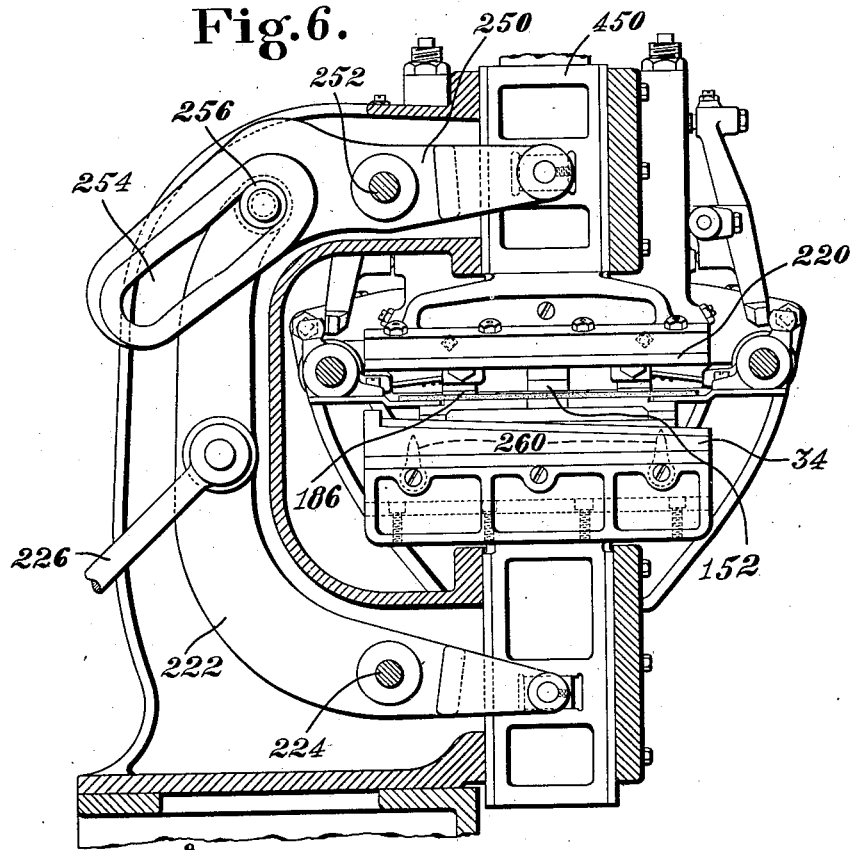
Fig. 6 is a vertical, sectional view taken transversely of the machine shown in Fig. 1 and designed to show the cutters for severing the sheets into sections.

In the illustrative machine and referring particularly to Fig. 1, there is provided a magazine indicated in general by the reference character 30 which is designed to receive sheets of the material to be operated upon by the machine. From this magazine each sheet is fed in successive steps for the operation of the cutters, the lower one of which is shown at 34, the result being that the sheet is divided into a predetermined number of sections of uniform dimensions. As each section is cut from the sheet it is held by gripper parts of a section feeding mechanism which carries the section into position over the die 36 which die is the farther one from the cutter 34 in the direction of feed of the material. After the die 36 operates to cut one blank from the section of sheet material the remainder of that section is carried to the right into position over die 38 where a second blank is cut from the remaining portion of the section, the cutting operations on different sections of the material taking place simultaneously through the operation of both of the dies 36 and 38 in a manner that will hereinafter be more fully described.

Figure 18:
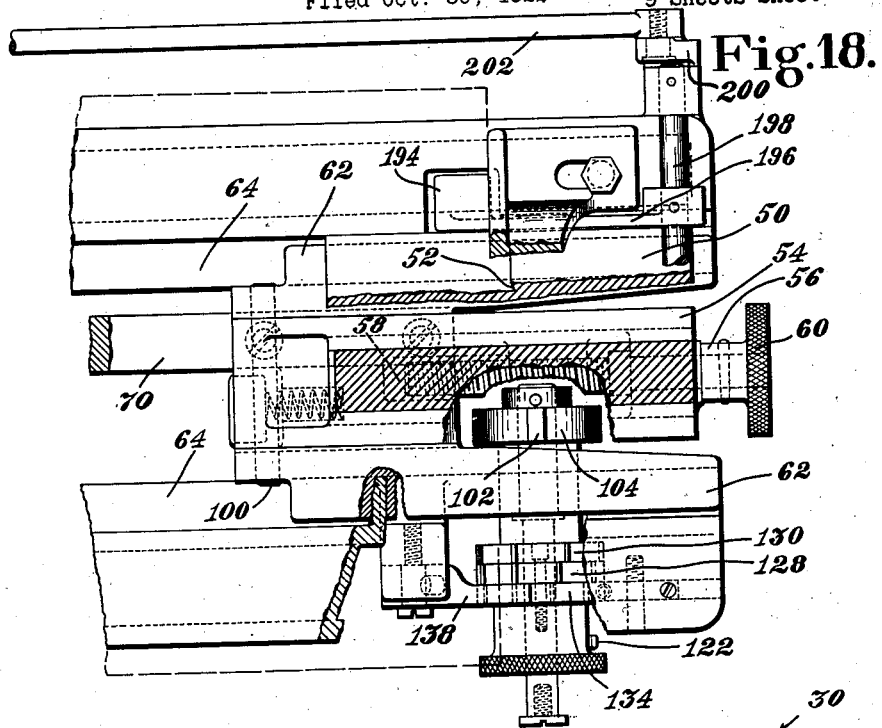
Fig. 18 is a plan view partly in section of the right end of the magazine, as viewed in Fig. 1.
Figures 19, 20:
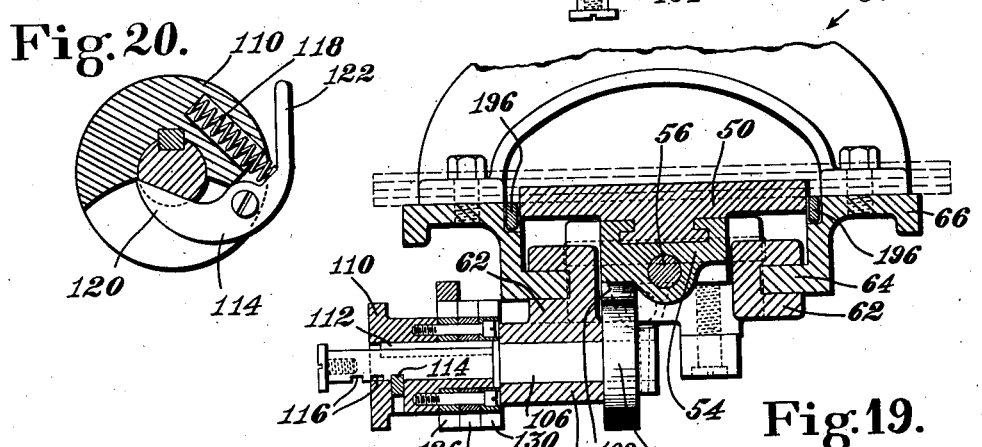
Fig. 19 is a transverse, vertical sectional view of the parts shown in Fig. 18.
Fig. 20 is a detail view of a latch arranged for co-operation with parts shown in Figs. 18 and 19.
Figure 21:
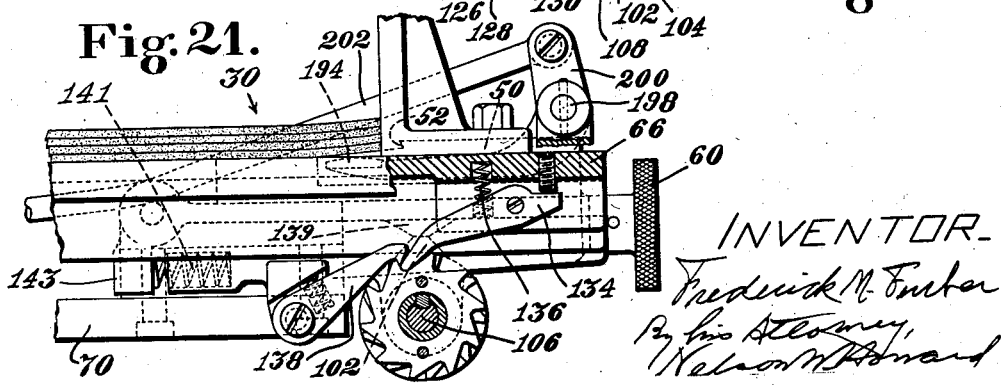
Fig. 21 is a view in side elevation and partly in section of the magazine parts shown in Fig. 18.

As stated above, means is preferably provided for feeding sheet material from a magazine 30, the said means comprising in the illustrative construction a reciprocable feeding member 50 having a shoulder 52, shown in full lines in Fig. 18 and in dotted lines in Fig. 21 of the drawings, adapted to engage the rear end of the lowermost sheet to project the forward end of the sheet from the magazine and in a direction toward the cutter 34. In order that the feeding member 50 may be adjusted to effect feeding movements of varying extent, it is slidably mounted in a holder 54, being dovetailed therein, as shown in Fig. 19, and a screw-threaded member 56 carried by the holder for rotation therein at its forward end is screw-threaded into a downwardly projecting portion 58 of the member 50 so that upon rotation of the member 56 through manipulation of the knurled hand wheel 60 the feeder member 50 is adjusted on its holder 54 in a well-known manner. In the construction shown the holder 54 is mounted upon a carriage 62 having guideways in each lateral surface for sliding engagement with ribs or flanges 64 extending inwardly from each side of the stationary framework 66 of the magazine 30. For reciprocating the carriage to cause operative feeding movements of the feeding member 50, there is provided a bar 70 fixedly secured to the carriage and having thereon rack teeth 72 (Fig. 1) arranged to be constantly in mesh with the teeth of a gear 74 at the upper end of a vertical shaft 76 mounted in bearings on the frame of the machine, the lower end of the shaft having fixed thereon a gear 78 which is in mesh with a segment gear 80 at the upper end of a lever 82 pivoted at 84 in the frame of the machine. For oscillating the lever 82 there is provided a link 86 pivoted at 88 on the lever and having its other end pivoted at 90 to an arm 92 of a lever 94 which is power operated by means which will hereinafter be described. Upon each rocking movement of the lever 94, the lever 82 is oscillated to cause rotative movement of the shaft 76 whereby the bar 70 is reciprocated back and forth beneath the magazine 30. If no provision were made to the contrary, reciprocation of the bar 70 would effect corresponding feeding movements of the feeding member 50. Inasmuch, however, as it is desired to utilize the feeding member 50 simply as a means for projecting the forward end of the sheet from the magazine, thereby positioning it for the operation of other feeding mechanism, it is necessary to insure that succeeding reciprocations of the feeding member 50 shall be idle ones until it is time to project the next sheet from the magazine. Hence, the holder 54 for the feeding member 50 is pivoted at 100 (Fig. 18) in the carriage 62, and means is provided for lifting the rear end of the holder at certain predetermined intervals so as to project the shoulder 52 on the feeding member 50 into position to engage the rear end of the lowermost sheet. As shown, the means for lifting the holder 54 up into position shown in Fig. 21, comprises a cam projection 102 on the cam member 104 which is secured to the end of a shaft 106 carried in a bearing 108 on the carriage 62. For rotating the shaft 106 to bring the cam projection 102 into its operative position (as disclosed in Figs. 18, 19 and 21) at regular intervals, which may be varied as required, there is provided a sleeve 110 keyed at 112 to the shaft 106 for rotation therewith but slidable longitudinally of the shaft and held in adjusted position by means of a latch 114 adapted to engage selectively in any one of three notches 116 (Fig. 19). Referring to Fig. 20, it will be observed that the latch 114 is pivoted on the sleeve 110 and is pressed upon by a spring 118 so as to hold its operative end 120 in the selected notch 116 and that said latch has further a finger piece 122 so that it may be readily operated against the pressure of the spring 118 to withdraw the operative end 120 from the notch with which it is engaged, whereupon the sleeve 110 may be adjusted slidably along the shaft 106 to engage the latch with another notch 116.

Mounted upon the sleeve 110 in fixed relation thereto is a plurality of ratchet wheels 126, 128, 130 which are positioned selectively in the manner described to cooperate with a pawl 134 pivoted upon the frame of the magazine or upon any suitable bracket fixedly secured to the magazine frame, the arrangement being such that upon each reciprocation of the carriage 62 the pawl 134 engages with one of the teeth of the selected ratchet wheel to turn the shaft 106 one step in a rotative direction for each reciprocation of the carriage. For holding the pawl 134 yieldingly in operative position, there is provided a spring 136 (Fig. 21), and for preventing movement of the ratchet wheel in the reverse direction there is provided a pawl 138 on the carriage which is spring-pressed, as indicated, to engage a tooth of the selected ratchet wheel (126, 128, 130). The outside ratchet wheel has ten teeth, the next one nine and the inner ratchet wheel 130 has eight teeth so that when the outside wheel 126 is in operative position the cam projection 102 will be placed in operative position to lift the feeding member 50 once in each ten reciprocations of the carriage while the innermost ratchet wheel 130 will lift the cam projection 102 to operative position once in eight reciprocations of the carriage. During the remainder of the time the holder 54, together with the feeding member 50, are in lowered position so that the shoulder 52 will not engage with the end of the sheet resting upon the floor of the magazine at the rear portion thereof, that is, not until the lowermost sheet has been entirely fed from the magazine by other means which will be described. When, however, the preceding sheet has been entirely fed from the magazine the feeding member 50 will be elevated through the successive rotative steps of the shaft 106 to its operative position so that it will engage the rear end of the then lowermost sheet to project its forward end from the magazine, the reciprocation of the carriage which effects such ejection of the sheet being followed by a rotation of the shaft 106 which turns the cam projection 102 downwardly away from the holder 54 so that the latter at once drops to the inoperative position for the feeding member 50. In the construction shown the cam 102 on the shaft 106 cooperates with a similar cam 139 on the lower surface of the holder 54. To insure that the holder 54 will drop promptly when the cam 102 is turned away from the cam 139, a spring 141 is provided to press against a projection 143 on the holder, thus assisting gravity in moving the holder downwardly about the pivot 100.

In order to facilitate the feeding of but one blank or sheet of material from the magazine the end wall 150 of the magazine adjacent to the cutting means is provided with an adjustable gate 152 (Figs. 7 and 9) which is secured fixedly with relation to the front end of the magazine by means of bolts 154 movable in slots having their greatest transverse diameter lying in a vertical plane. Adjustment of the gate is secured through proper manipulation of a screw-threaded member 156 which has a portion of its head rotatably engaged in a slot in the upper end of the gate, and after adjustment the gate is secured in adjusted position through tightening of the bolts 154. Obviously the lower end of the gate should be spaced from the adjacent floor of the magazine a distance which is slightly greater than the thickness of any single sheet in the magazine. In view of the fact that some of the sheets may have portions which are corrugated, curled, or otherwise distorted, thus presenting difficulties from the standpoint of proper feeding of the material, it is desirable to provide means for insuring the proper control of the forward ends of the sheets under all circumstances whatever the nature of material being utilized for the manufacture of blanks. Accordingly, guiding means for the forward end of the lowermost sheet is provided comprising, in the illustrated construction, an elevated part in the floor of the magazine adjacent to the gate and directly subjacent the gate and spaced therefrom a distance corresponding substantially to the thickness of the individual sheet. On each side of this elevated part the floor slopes away to each side of the magazine, thus leaving a wider space through which curled or corrugated or otherwise distorted parts of a sheet may pass without meeting any obstruction. Conveniently the elevated part referred to is provided by a plate 164 (Fig. 8) having a beveled surface 166 which directs the forward edge of the sheet upwardly to the elevated part or plate. The said plate having further sloping surfaces 168, 170 at each side of the elevated portion to provide supporting surfaces for the sheet on each side of the elevated portion so that there is no abrupt change which would be likely to cause injury or damage to the material. Farther in the feeding direction other surfaces 172, 174 slanting upwardly to the top surface of blocks 176, 178, respectively, serve to lift the side portions of each sheet to a common plane with the central portion thereof at the time the end of the sheet is at the exit opening. As a further means for guiding and controlling the forward end of each sheet as it is projected from the magazine, the lower surfaces of the end wall 150 of the magazine are provided on each side of the gate with an upwardly and inwardly flared surface 153 (Fig. 9) so that the end of the sheet, if curled upwardly or otherwise distorted, would be sure to engage with the slanting wall above the exit passage and thus be directed downwardly to the outlet itself which is of a height from the plane surface furnished by blocks 164, 176 and 178 corresponding closely to the thickness of the sheet. In other words, as the sheet emerges at the outlet it is constrained to lie flat upon the surfaces of the blocks just mentioned. To assist further in holding the sheet flat and in contact with the supporting surface of the magazine floor extension 184 a plurality of spring members 186 (Fig. 7) is provided attached to the end wall 150 of the magazine and having outturned portions to engage the upper surface of the sheet and press it firmly on the supporting surface. For the purpose of pressing the sheets in the magazine down upon the floor of the magazine adjacent to the exit passage there is conveniently provided a weighted member 188 (Figs. 1 and 7) which is shown as a pivoted lever in order that it may perform a further function which will now be described.

Means is preferably provided for preventing the feeding of sheets from the magazine when the number of sheets therein has been reduced below a predetermined minimum. If, for instance, the feeding means could continue until but one sheet was left in the magazine, then the introduction of other sheets by the operator would be likely to disturb the position of the bottom sheet by pushing it forwardly into the exit opening in a direction toward the cutter 34. This would result in improper feeding of the sheet and the production of improper blanks. The mechanism provided in the illustrative machine comprises a lifting means below the rear ends of the sheets in the magazine so that the shoulder 52 on the feeding member 50 can not engage with the rear end of the lowermost sheet. As shown, the lifting means comprises two plates 194 (Figs. 18, 19 and 21), one on each side of the feeding means and located at the end of arms 196 fixedly secured to a shaft 198 mounted in bearings provided by the magazine frame. Extending upwardly from one end of the shaft 198 is an arm 200 having pivoted at its upper end a link 202 which is adjustable in length through a turnbuckle 204 (Fig. 1) and has a slotted end 206 in which is received a pin at the lower end of the lever arm 208 which is fixedly secured to the shaft or pivot bar 210 of the weighted member 188. It will be clear that as the weighted member 188 descends with the lowering of the sheets in the magazine the pin at the lower end of the lever arm 208 will move to the right in the slotted end 206 of the link 202 until finally it will contact with the portion of the link at the end of the slot to move the link 202 to the right in Fig. 1, thus rotating the shaft 198 in a direction to lift the plates 194. As these plates rise they lift the rear ends of the sheets in the magazine 30. It is a matter of adjustment to insure that the lifting of the plates 194 will take place at a predetermined point in the exhaustion of the sheets in the magazine. Ordinarily the weighted member 188 drops low enough upon the removal of the fourth sheet above the bottom of the pile to effect the lifting of the plates 194 and the consequent interruption in the feeding operations of the feeding member 50. Conveniently the sides 214 of the magazine 30 are adjustable simultaneously toward and from each other to accommodate sheets of different widths. The adjustment is provided for in a well-known manner and accomplished through manipulation of hand wheel 216.

In the illustrative machine the means provided for cutting the sheet material into sections comprises the cutter 34 and a cooperating cutter 220 (Figs. 6 and 7), the cutters being located at a predetermined distance from the inside surface of the end wall 150 of the magazine, and the feeder member 50 being so adjusted as to project the lowermost sheet with its forward end just to the plane of the rear face of the cutter 34, unless scrap or excess material is to be cut off with the first section, as will be hereinafter described. Preferably, though not necessarily, one of the cutters has its cutting edge in a horizontal plane while the other is inclined so that the cutting is a shearing operation. As will be clear from Fig. 6 of the drawings the lower cutter 34 has the inclined edge and is movable toward the upper cutter through the operation of the lever 222 pivoted at 224 on the frame of the machine and operated by a link connection 226 with an arm 228 mounted loosely on a shaft 230 and arranged to be oscillated through lever arms 232 and 234 (Fig. 10) which carry rolls 236 and 238 respectively for contact with cams 240 and 242 respectively on the main shaft 243 by which the lever 222 is rocked in properly timed relation to the feeding portions to cut each sheet into sections of uniform dimensions. At the same time that the lower cutter 34 moves upwardly the upper cutter 220 is moved downwardly through the operation of a lever 250 pivoted at 252 in the frame of the machine and having a cam slot 254 in which runs a roll 256 at the upper end of the lever 222. The construction and arrangement is such that the upper cutter 220 is moved into contact with the upper surface of the sheet material at the beginning of the shearing action produced by the inclined edge of the lower cutter.

Means is preferably provided for insuring that the remnant piece at the rear end of the sheet will not be carried in with the advance end of the next succeeding sheet. This might happen if the said remnant or scrap end of the sheet were permitted to stick to the upper knife or cutter 220. To take care of this remnant piece there is provided on the lower knife 34 a pair of V-shaped members 260 attached to the rear surface of the said cutter and having sharpened or piercing upper ends extending adjacent to the plane of the cutting edge of the cutter so that the material is forced upon the V-shaped members during the cutting operation, the opposed inclined surfaces of the two V-shaped members serving to wedge the remnant piece more or less firmly in place upon the cutter 34, thus carrying the said piece downwardly with the downward movement of the lower cutter. Upon succeeding operations, the lowermost remnant piece is finally forced off of the V-shaped members and drops into a scrap heap or into a receptacle placed to receive the scrap. It will be noted that the upper cutter 220 possesses a pusher surface 261 which serves to force a remnant piece, if such be present, down upon the members 260.

Beyond the cutters in the direction of feed of the material there is located, as before stated, a number of dies. In the present embodiment of the invention two dies are provided, namely the dies 36 and 38, and for co-operation with the dies there is mounted for reciprocation in the head or housing 270 (Figs. 1, 13 and 14) a pair of mallets 272, 274, one to co-operate with each die, said mallets being connected by a web member 276 which may be integral with or fixedly secured to each mallet. Conveniently, and as shown, the mallets are separate from the web member 276 and are removably secured thereto so that they may be replaced as occasion may require. As shown, the web member 276 is expanded at each side into wide flange portions 278 which are slidable in guideways in the head or housing 270. Conveniently the housing 270 comprises side portions or facings 280 (Fig. 14) secured to the central portion 282 by bolts 284, 286 so that these facings may be removed and the whole supporting structure for the mallets disassembled as a unit from the housing 270. As shown, a number of filling plates or gibs 288 and 290 and adjusting screw 292 are provided to force one of the gibs in a direction to keep the parts in tight sliding relation to each other in spite of any wear that may take place during continued operation of the machine. For reciprocating the mallets there is provided a toggle mechanism comprising links 296 and 298 (Figs. 12 and 14), the former being pivoted at 300 to the web 276 and the latter at 302 to the head or housing 270. The upper toggle link 298 is in the form of a bell-crank and has one portion connected by a link 304 to an arm 306 secured to a hub 308 (Fig. 5) on the shaft 230, said hub having secured thereto lever arms 310 and 312 carrying rolls 314, 316 respectively for engagement with these cams 318 and 320 by the operation of which the toggle is alternately broken and made, thus causing reciprocation of the mallets toward and from their respective dies.

Figure 12:
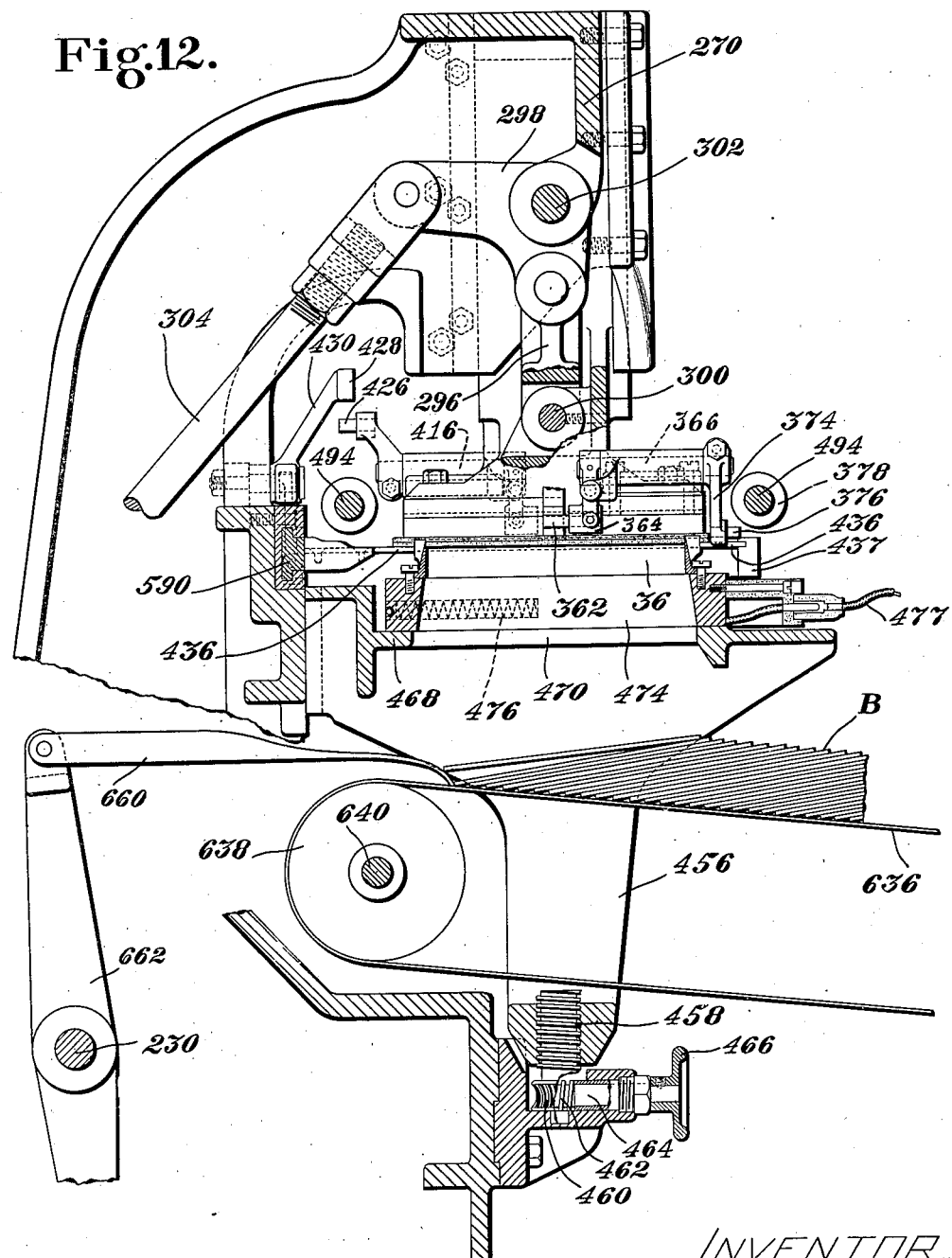
Fig. 12 is a vertical, sectional view taken transversely of the machine shown in Fig. 1 and extending down through the left hand die in the last-mentioned figure and showing also a blank ejecting means.
Figure 13:
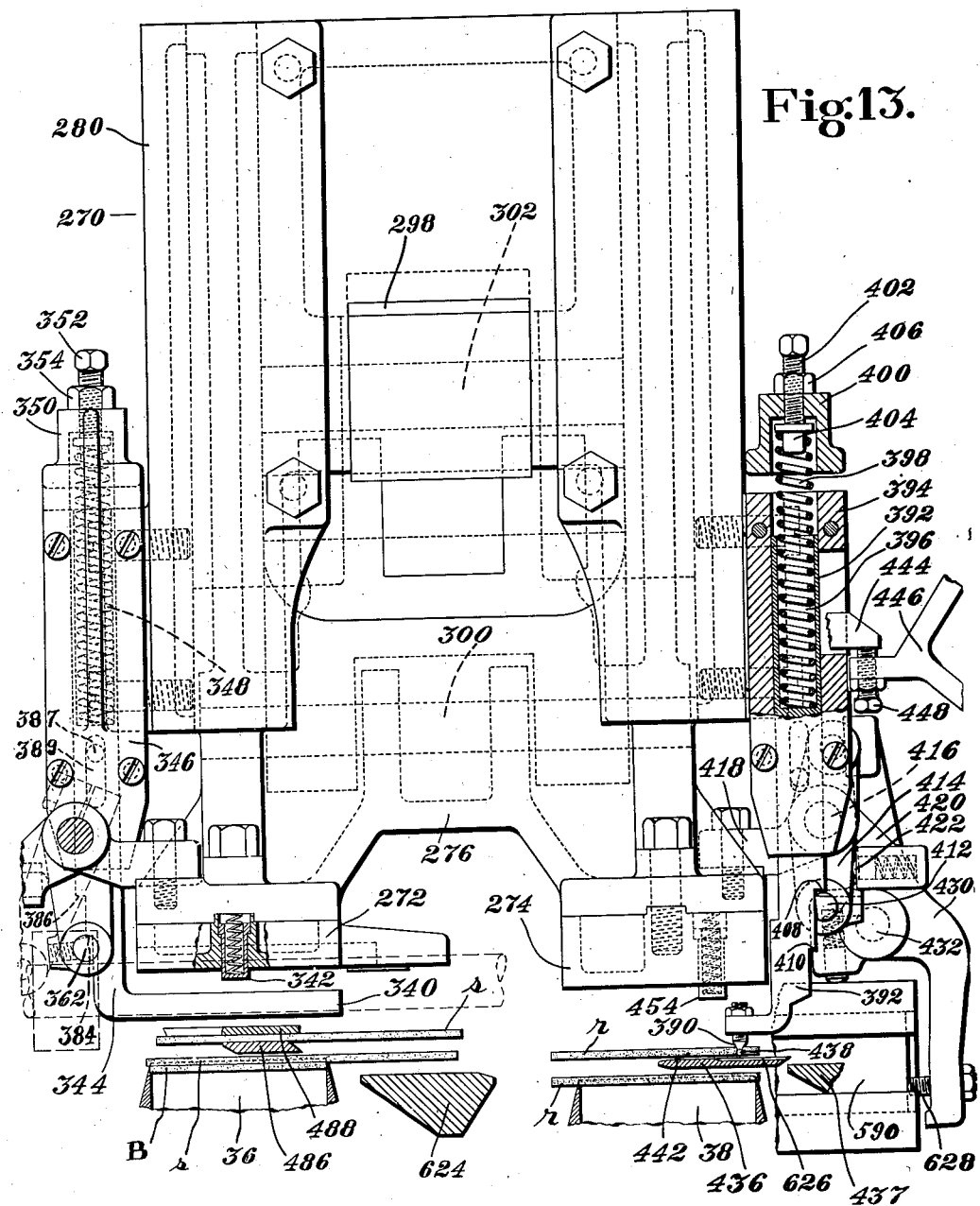
Fig. 13 is an enlarged front view of the central portion of the machine shown in Fig. 1 disclosing the mallets and the mechanisms for operating the blank controlling and retaining means.
Figure 14:
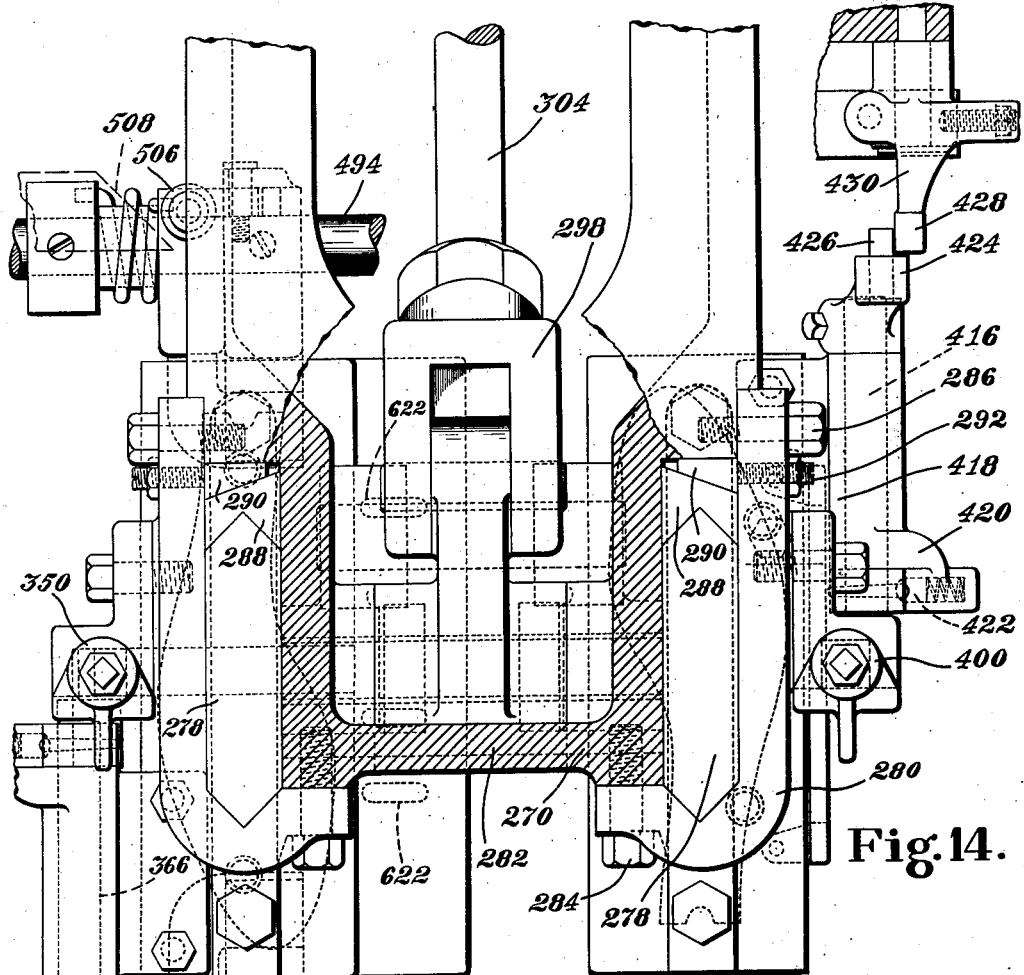
Fig. 14 is a horizontal sectional view of parts of the mechanism shown in Fig. 13.

Associated with the mallet 272 is a presser foot 340 (Figs. 13 and 15) which is adapted to contact with the upper surface of the section of material to clamp it on the die at the instant it is being released by the feeding mechanism so as to prevent possible displacement due to such release of the section. It will be understood that the lower face of the mallet 272 is provided with a recess fitted to receive the presser foot 340 so that the latter becomes a part of the mallet and presents with the mallet a single, smooth surface operative to force the material upon the die. The mallet is also provided with one or more spring-pressed plungers, one of which is shown at 342 (Fig. 13) projecting below the lower face of the mallet, the function of the plunger or plungers being to hold the material on the die as the mallet rises toward initial position, it being clear that under certain conditions, especially where adhesive material is used, there might be a tendency for the section of material to adhere to the lower surface of the mallet. As shown, the presser foot 340 is mounted upon or is integral with the lower end of a plunger member 344 which extends upwardly within a casing 346 attached fixedly to the outside of the head or housing 270. Conveniently, the plunger member 344 is provided at its upper end with a socket which receives the lower portion of a spring 348, the upper portion of which rests within a cap 350 which is an extension of the casing 346, the said cap receiving at its upper end, a screw-threaded member 352 which is adjustably fixed thereto by means of a set nut 354, the lower end of the member 352 projecting into the upper end of the spring 348, all as shown more clearly in connection with the plunger member 392 on the opposite side of the housing 270 in Fig. 13 of the drawings. It will be understood that the spring 348 serves, when put under tension, to project the presser foot 340 into contact with the section of material just being released by the feeding mechanism and to hold the said section yieldingly in place on the upper end of the die. In order to lock the plunger 344 in its upper position of rest within the casing 346 there is provided a latch consisting of a hardened block 362 (Figs. 12, 13 and 15) mounted in an arm 364 fixed upon a shaft 366 carried in bearings provided by brackets 368 extending out from one side of the mallet 272, the said arm 364 being constantly urged toward latching position by means of a spring-pressed plunger 370 mounted in a bracket integral with or secured to the bracket 368. Secured to the other end of the shaft 366 is an arm 374 (Fig. 12) which extends downwardly practically parallel with the arm 364 and which has a pin 376 that is adapted to be engaged by a portion of the feed mechanism, as will be described, so as to cause tripping or withdrawal of the latch 362 practically simultaneously with the release of the material being fed by the feeding mechanism. It is sufficient to say at this time that when the pin 376 is struck by the collar 378 on the rod 494 that the shaft 366 is rocked, carrying the latch 362 away from the shoulder 384 on the plunger 344, thus permitting the spring 348 to throw the plunger downwardly, clamping the work upon the die. As the mallet 272 rises the latch 362 rises with it and re-engages the shoulder 384 to carry the plunger 344 upwardly against the tension of the spring 348, the plunger remaining in upward position with the presser foot 340 spaced from the die, as shown in Fig. 13, until it is tripped at the proper time, as already described. Preferably the plunger 344 is provided with a second shoulder 386 so that the latch member 362 will engage therewith to prevent excess movement of the presser foot 340 toward the die in case the machine should happen to be operated without work being present, in which case the die would be damaged by the presser foot if some such means as that provided by the second shoulder 386 were not employed to control the presser foot. To insure against injury to the die by the presser foot contacting therewith, there is provided a pin 387 secured to the plunger 344 and adapted to contact with the bottom of the slot 389 in the stationary casing 346 to put an absolute limit to the downward movement of the presser foot at a point where it cannot strike the die.

Means is provided in connection with the other mallet 274 for controlling the piece of material which has been brought to the die 38 by the auxiliary feed mechanism which will hereinafter be described. From another viewpoint this means may be considered as a positioning means for said piece of work, being operative also to prevent displacement by the feed mechanism referred to as the latter starts to return to initial position preliminary to the feeding of a succeeding piece. As shown, the work controlling or positioning means for the die 38 and mallet 274 comprises a pointed member 390 (Figs. 13 and 15) carried at the lower end of a plunger member 392 similar in all respects to the plunger member 344 which carries the presser foot 340 associated with the other mallet 272. More particularly, the plunger member 392 is mounted in a casing 394 for vertical sliding movement therein and has a socket 396 for the reception of a spring 398, the upper end of which is located in a cap 400 fixed to or integral with the casing 394, there being a screw-threaded member 402 set in the top part of the casing and having an end 404 projecting into the upper end of the spring 398. By means of the set nut 406 the member 402 may be adjusted so as to adjust the tension of the spring 398.

Figure 15:
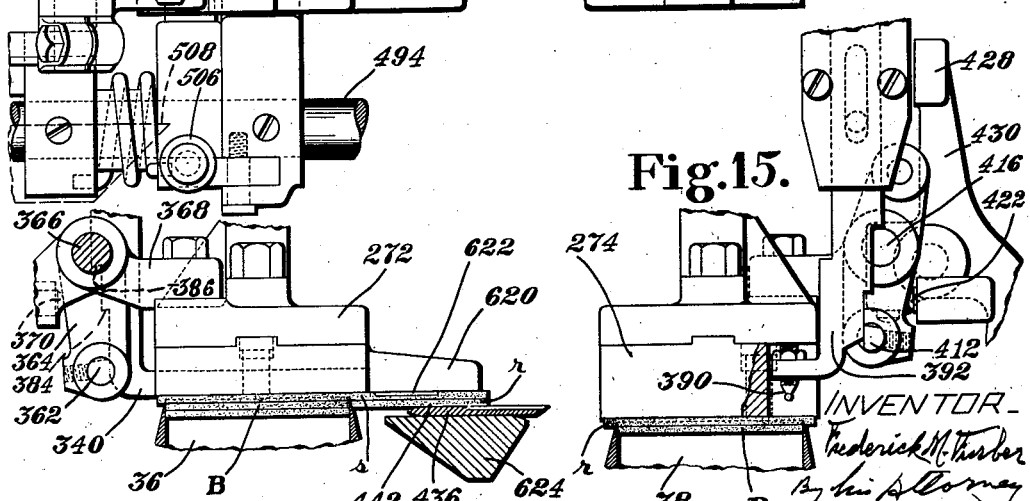
Fig. 15 is a detail of both dies with parts which co-operate therewith during cutting operations, the said parts being shown at a later period in the operation of the machine, as compared with the similar showing of these parts in Fig. 13.

At its lower end the plunger member 392 is provided with two shoulders 408 and 410 adapted to be engaged by a latch comprising a hardened pin member 412 carried at the end of an arm 414 (Figs. 13, 15) fixed on a shaft 416 mounted in bearings provided by a bracket 418 secured to the upper part of the mallet 274 or to the support for the mallet. Extending laterally from the bracket 418 is an arm 420 having a downwardly extending part in which is mounted a spring-pressed plunger 422 which constantly presses against the side of the arm 414 which carries the latch 412. At the other end of the shaft 416 is an arm 424 which extends upwardly therefrom and has a pin or other projection 426 which is located at the proper time in the path of movement of the upper end 428 of a lever 430 pivoted at 432 on the frame of the machine at the rear of the dieing out station (Figs. 12, 13, 14 and 15). As will be later described more in detail, the lever 430 is arranged to be operated by a part of the feed mechanism which positions the work over the die 38 so that at the proper time the said lever 430 is operated to swing the end 428 thereof against the pin 426, moving in a direction toward the left in Fig. 14, thereby moving the latch 412 to the right as viewed in Fig. 13, unlatching the plunger member 392. When this unlatching occurs the plunger is shot downwardly due to the operation of the spring 398, and the prong or sharpened member 390 is forced into the work as most clearly shown in Fig. 13, the work at the time resting upon a feed member 436, a part of the auxiliary feed referred to above, while the feed member has a portion of its width resting upon the fixed support 437 so as to prevent distortion of the feed member due to impacts of the plunger 392. As shown, the pointed member 390 has a ball-shaped end 438 which, after penetrating the work, has the advantage of holding the work much better than would a pointed portion of uniform diameter. Preferably, and as shown in Fig. 5, the plunger 392 carries a cross bar 440 so that two members 390 are provided to engage the sheet of material at widely spaced points, thus securing better control of the piece of material which is relatively much longer than it is wide in the particular blank which the illustrated machine is designed to make. It will be understood that the feed member 436 of the auxiliary feed mechanism is returned to initial position at the left of Fig. 13 (as shown in Fig. 15) before the mallet 274 comes down upon the piece of material which is held by the pointed members 390. Prior to the described movement of the feed member 436 the plunger 392 is lifted in an upward direction so that the pins 390 lift the section of material away from the claw 442 on the member 436 (Figs. 13 and 15). This movement of the plunger member 392 is effected by co-operation of a projection 444 (Figs. 1, 6 and 13) rigidly secured to the plunger member 392 and an arm 446 carrying an adjustable set screw 448 for contact with the projection 444, the said arm 446 being secured to and movable with the support 450 for the upper knife 220. Upon descent of the mallet 274 toward the die 38 the material is stripped from the pins 390 and carried down upon the cutting edge of the die, as most clearly shown in Fig. 15 of the drawings. While in this figure the mallet 274 appears to have a cut-away portion extending over the cutting edge of the die and adapted to receive the pin 390, this is in fact not the case, as will be clear from an inspection of Fig. 5, wherein the pins 390 are seen to be within the contour of the mallet 274 but exterior to the periphery of the die 38. As shown in Fig. 13 the mallet 274 is also provided with spring-pressed plungers 454 for the purpose of stripping the material from the lower surface of the mallet as the latter rises after a cutting operation.

In the illustrated machine means is preferably provided for mounting the dies independently of each other and for adjustment in a vertical direction so that the support for the die may be adjusted to make up for the decreased height of the die due to the sharpening of the edge and to wear thereof as well as to provide for changes in the vertical dimension of the different dies which may be used with the machine. Inasmuch as the mounting for the dies is similar, a description of one will be sufficient for understanding this feature of the invention. As shown, the support comprises a hollow frame member 456 (Figs. 1 and 12), there being cooperating guide flanges on the member 456 and on the frame of the machine for holding and guiding the member 456 during vertical adjustment thereof. At its lower end the frame 456 is provided with an internally screw-threaded opening for a screw 458 which carries a gear 460 secured thereto and which is in constant mesh with a worm 462 on a shaft 464 which is adapted to be turned through manipulation of the hand wheel 466. Upon turning the hand wheel in the proper direction the frame 456 may be adjusted upwardly or downwardly as desired. The upper end of the frame 456 presents a platform 468 for supporting the die 36 or 38 and has an opening 470 which coincides with the opening in the die so that the blanks cut by the die can drop through the die and the platform and upon any means provided for discharging the blanks from the machine. The platform 468 is conveniently provided with guide ribs 472 (Fig. 1) which cooperate with correspondingly shaped grooves in a holder 474 for the die to which the die is preferably secured by screws or other fastening means, it being preferable, however, to treat the die and its holder 474 as a unit in introducing it into and removing it from the machine. A spring-pressed latch 475 is conveniently used to retain the die holder 474 in position.

For certain kinds of material which it is desired to cut into blanks, it is desirable that the dies should be heated in order to prevent the material from sticking too firmly to the die, and for this purpose heating coils 476 are introduced in sockets in the holder, one near each extremity and on opposite sides of the elongated die. Each holder 474 carries also electrical conductors 477 leading to the coils and readily attachable to any source of electric supply. It will be understood that while, in the present machine, the dies are shaped to correspond to half soles or fillers that dies of other shapes may be readily substituted therefor, according to the product that is desired. As shown in Fig. 5, a cutting blade 478 is located at the toe portion of each die to sever the material being operated upon, since it would otherwise accumulate around the toe part of the die as it is forced down upon the die. Similarly two blades 480 are provided at the opposite end of each die, and in connection with the die 38 it has been found desirable to have still another cutter 482 to sever the scrap on this side of the die. By reason of the blades or cutters provided the material is readily separated from the sides of the die while the blanks go down inside the die at the same time, both the scrap and the blanks being moved downwardly through the pressure of the mallets above.

It will be recalled that the feeding member 50 at the far end of the magazine operates to move the sheet of material to a position where its front end projects from the magazine (Fig. 7) and that thereafter although the feeding member 50 continues to reciprocate it has no further feeding function with respect to the sheet which it has projected from the magazine, further feeding of the sheet being carried on by mechanism which will now be described. When the sheet has been projected from the magazine by the feeding member 50 a predetermined distance it is seized at its side edges by a pair of grippers 484 (Figs. 5, 16 and 17), each comprising upper and lower jaws 486, 488, the latter being preferably provided with teeth 490. As shown, the jaw 486 is fixedly secured to a collar 492 which is in turn fixedly attached to a rod 494, there being two such rods, one at the front and the other at the back of the machine and reciprocable in bearings 496, 498 (Figs. 1 and 5) formed on brackets secured to or integral with the machine frame. The movable jaw 488 is secured to a collar 500 which is rotatably mounted on the rod 494 and is urged constantly into gripping relation with respect to the lower jaw by means of a spring 502, one end of which is secured to the movable collar and the other end to the fixed collar 504. When the rods 494 are at the left extreme of their stroke a roll 506 on the movable collar 500 comes in contact with the stationary cam surface 508 (Fig. 5) on the cam member 510 whereby the collar 500 is rotated, tensioning the spring 502, and becomes locked with the jaw 488 in open relation with respect to the fixed jaw 486, the pivoted latch 512 (Fig. 17) serving to hold the movable collar and jaw in open position. As the bars 494 approach the right extreme position, in Figs. 1 and 5, the latch 512 contacts with an adjustable stop or abutment 514 so that upon termination of the movement in this direction the movable jaw 488 is tripped to clamp the material. It will be observed that the gripper jaws overlap the lateral edges of the strip of material S (Fig. 16) so that the material is firmly gripped, thus insuring proper feeding of the strip or sheet from the magazine even though the latter be full of sheets exerting a very considerable pressure on the sheet resting on the bottom of the magazine.

Figure 7:
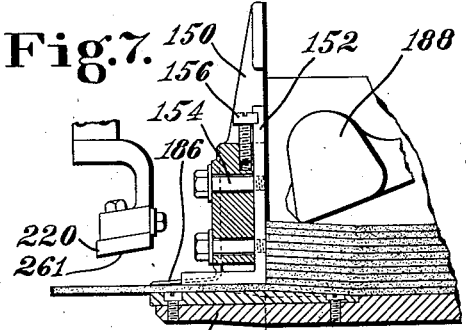
Fig. 7 is a detail, sectional view of the forward ends of the magazine and disclosing the relationship of the cutters with respect thereto.
Figure 8:
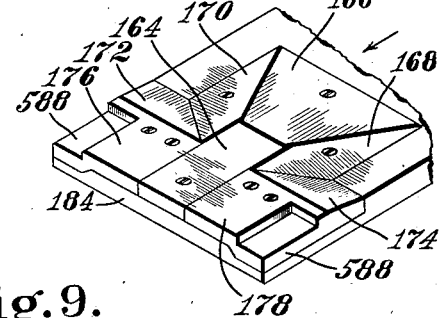
Fig. 8 is a perspective view of that portion of the floor of the magazine shown in Fig. 7.
Figure 9:
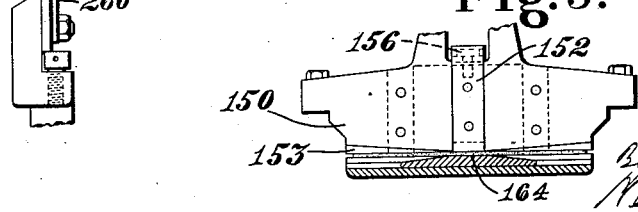
Fig. 9 is a section along the line 9—9 of Fig. 7.

In order to insure, however, that the upper jaw will be firmly clamped on the material with the teeth 490 on said jaw embedded in the material, there is provided a hammer adapted to operate on each upper jaw 488 to strike it a blow, thus insuring firm clamping of the material. It will be understood that the description given above of one pair of gripper jaws applies equally to the other and this is also true of the hammer mechanism which will now be described. Mounted in a casing 516 (Fig. 16) carried by the machine frame is a hammer bar 518, containing in its upper end, a socket in which is located a spring 520, the upper end of which is received in a socket in a cap member 522 screwed into the upper end of the casing and secured adjustably in place by a set nut 524. For elevating the hammer bar 518 against the tension of the spring there is provided a rack 526 on the bar with which meshes a segment rack 528 on a lever 530 pivoted at 532 in a bracket fixed to the machine frame and carrying at its outer end a roll 534 which is contacted with by the end surface 536 of an arm 538 fixed to and reciprocable with the knife support 450 of the upper movable cutter 220. Hence, on the downward movement of the upper knife the hammer bars 518 are elevated and are locked in elevated position by trip members or latches 540 each of which engages with a notch 542 near the upper end of the hammer bar. As shown, the latch is adjustably but fixedly connected in the upper end of a trip lever 544 pivoted at 546 on a stationary part or bracket and held yieldingly in latching position by means of a spring-pressed plunger 548 carried by the lever. The lower end of said lever is provided with a cam projection 550 which will be located in the path of movement of the roll 506 on the movable collar 500 carried by the bars 494. The arrangement is such that following the tripping of the latch 512 with the consequent operative movement of the movable jaw member 488 the projection 550 is struck by the roll 506 and with the result that during clamping movement of the upper jaw the hammer bar is released and projected downwardly, striking the upper jaw a smart blow to effect firm clamping of the material by the jaws. Preferably the hammer bar 518 carries at its lowest end a fibre block 552 which contacts directly with the jaw 488 in transmitting the blow of the hammer bar and by reason of its composition contributes to a less noisy operation of the machine. If desired the hammer bar 518 may be provided with a shoulder at 554 arranged to contact with an adjustable set screw 556 in case, through some oversight, no material is in the gripper jaws at the time they are closed. In other words, the shoulder 554 in co-operation with the set screw limits the downward movement of the hammer bar 518 and provides a safety device to prevent overthrow and possible damage to the movable jaw 488. Furthermore, to insure proper operation of the hammer and of the movable jaw 488, the jaws, at the time they grip the material S, rest upon a platform 588 provided by a recessed portion of the floor extension 184 of the magazine (Figs. 7, 8 and 16). Conveniently, the forward edges of the jaws 486 are beveled so that they will be sure to get upon the upper surface of the platforms 588 during the movement of the carrying rods 494 toward the gripping position of the gripper jaws. Furthermore, the rear edges of the jaws 486 are beveled so as to insure their riding over the material which is moving in the direction of the die 38 from die 36. At each reciprocation of the rods 494 the sheet or strip of material S is pulled a predetermined distance toward the left in Fig. 1, at which time there is a dwell in the movement of the rods 494 during which the cutters 34, 220 operate to cut off a section s from the strip or sheet, it being understood that the grippers, at the time of the cutting operation, are at the left (Fig. 1) of the cutters 34, 220. It is during the downward movement of the cutters that the hammer bars 518 are elevated so that they are in position to be tripped during the next forward movement of the gripper jaws. After the dwell mentioned the bars 494 continue their movement with the section which has just been cut from the end of the sheet or strip and carry the said section past the first die 38 into position over the die 36 bringing the forward edge of the section always to the same line in predetermined relation to the far edge of the die 36, that is, the edge of the die 36 farthest from cutter 34. Upon descent of the mallet 272 the section is forced upon the cutting edge of the die 36 and finally the blank is forced into the die and the remainder r of the section, which is big enough to make another blank, is subsequently carried back toward the right in Fig. 1 in position over the other die 38 so that upon descent of the mallet 274 a blank will be cut from said remainder of the section.

Preferably, a separate and independently operated means is provided for feeding the material to the die 38, the said means comprising in the illustrated construction the feeding member 436 (Figs. 5, 13 and 15) which is in the form of a bar attached at one end to a slide 590 (Figs. 2, 5 and 12) movable in a guideway in the frame at the rear of the dies, as shown in the said figures. It will be noted that the plate 436 is attached to its moving means at one end only, the other or free end of the feeding member 436 being guided in a slot in a stationary bar 437 (Fig. 12) at the front of the machine so that it is properly supported during its feeding movement. Conveniently, a part of this bar 437, namely that part 439 (Fig. 5) in front of the die 38, is movable, being hinged to a stationary part of the machine frame at 441 so that it may be swung open to expose the die and give easy access to the die in order that scrap material may be removed in case the latter should pile up around this die. Connected to one end of the slide 590 is the operating means therefor comprising a lever 592 (Figs. 1, 2 and 5) having a forked end for slidably receiving a block 594 which is pivoted upon a roll 596 and a stud 598 extending laterally from the slide 590. Connected to an intermediate portion of the lever 592 which is pivoted at its lower end on the frame of the machine is a link 600 having its other end connected to the upper end of a lever 602 (Figs. 1, 5 and 10) pivoted upon a shaft 604 mounted in bearings in the frame of the machine. Another arm 606 of the lever 602 carries a roll which runs in the cam slot 608 of the cam 610 on shaft 611. It will be clear that upon rocking movement of the lever 602 the slide 594 will be reciprocated from a position adjacent the die 36 (Fig. 15) to a position over the die 38 (Fig. 13). In order to vary the operative stroke of the slide 590 and, therefore, of the feeding member 436, the connection between the link 600 and the lever 592 is adjustable, as shown most clearly in Fig. 2, the adjustment comprising a block 612 adjustable along a slot 614 in the lever 592, a screw-threaded member 616 being engaged with the block 612 by screw-threads so that upon rotation of the member 616 through manipulation of the knurled wheel 617 the block will be adjusted along the slot and held in adjusted position. Secured to the block 612 is a pin rotatably engaged in the end of the link 600. Conveniently, the block 612 is provided with a pointer 619 and the adjacent surface of the lever 592 with a scale or indicator 621, as shown in Fig. 2, by which the amount of adjustment of the block can be easily determined to accomplish the desired adjustment of the feeding movement of the feed member 436. Since the side cutting edge of the die 38 remote from the die 36 is always at the same predetermined distance from the far edge of the die 36 irrespective of the size of the dies, the feed of the member 436 must be adjusted whenever a different size of die is used, the feeding movement of 436 being less for larger sections than for smaller sections s.

In the operation of cutting blanks from the material the mallets 272 and 274 do not contact with the cutting edges of their respective dies but instead move toward the dies to such an extent or into such a position that the material is forced upon the cutting edge of the die to cut it more than half way through, the degree varying with the kind of material, so that in certain cases the extent of the cut may be as much as four-fifths of the way through the thickness of the material. It follows, therefore, that a blank is cut completely from the material by the die upon a subsequent operation of the mallet to force a succeeding section of material upon the die. This method of operation will be clear, with respect to both dies, upon inspection of Figs. 13, 14 and 15 of the drawings. It has already been stated that each section s of the material which has been cut from the sheet or strip S through the operation of the cutters 34, 220 is of a predetermined size sufficient to provide two blanks, one to be cut by the die 36 and the other by the die 38. It will be recalled that the section carried by the grippers 484 on the bars 494 (Fig. 16) is carried past the die 38 and to a position above the die 36 where the jaws are opened to release the section s which is almost simultaneously clamped upon the die or upon a preceding section through the operation of the presser foot 340. Subsequently the mallet 272 comes down upon the section s just deposited and forces it upon the cutting edge of the die (Fig. 15). Simultaneously with this operation the preceding strip has the blank B cut therefrom (Fig. 15) and simultaneously therewith the remaining portion r of the same section s is clamped upon the feed member 436 through the operation of a clamp extension 620 which is integral with or fixedly secured to the mallet 272. If desired a projecting portion 622 on the clamp 620 may be provided to effect a firmer clamping operation on the material to insure that the material is pressed firmly upon the claw 442 which extends upwardly from the upper surface of the feeding member 436. During the operation of clamping the material upon the feed member 436 the latter is resting upon a fixed table 624 which is carried rigidly with the frame of the machine. When the mallets 272, 274 are lifted the feed member 436 is moved to the right in Fig. 15 until it reaches the position shown in Fig. 13 over the die 38, this movement taking place in a short interval of time during which the gripper jaws 486, 488 on the bars 494 pass in the opposite direction carrying a new section s in a plane above the piece r and into position over the die 36. Thus, there is an interval of time in which the new incoming section is above the piece r which is a remainder from the preceding section. As soon as the feed member 436 reaches the position shown in Fig. 13, the plunger 392 is tripped so that the ball pointed member 390 is projected into the material of the piece r, a groove 626 being provided in the upper surface of the feed member 436 so that the ball 438 does not strike the plate or feed member 436. This tripping of the plunger 392 is accomplished conveniently by the end of the slide 590 striking the adjustable member 628 in the lower end of the lever 430 which, it will be remembered, is the trip lever for throwing out the latch 412 from engagement with the shoulder 410 on the plunger member 392. In the further operation of the parts the members 390 are lifted slightly to the position as shown in Fig. 13 so as to free the piece r from the claw 442 on the feeding member 436. Subsequently, the feed member 436 is moved back to the position it is shown as occupying in Fig. 15 while the gripper jaws 486, 488 have reached their position adjacent to the magazine 30. Following this both of the mallets 272, 274 descend simultaneously, by which the piece r of Fig. 13 is forced upon the cutting edge of the die 38, as indicated in Fig. 15, and a preceding piece r is forced completely upon the die to produce blank B. The described operations follow each other with the result that the dies are soon filled with blanks which are discharged downwardly through the lower end of the die and into a space where any desired form of discharge mechanism may be positioned to receive the blanks.

An inspection of Fig. 22 of the drawings will make clear the successive steps by which the sheet material is converted into blanks. In this figure the dotted line a represents the forward edge of the sheet as it rests in the magazine before any feeding movement has taken place, the line b representing the line of cut due to the operation of the sheet cutting means comprising the cutter blades 34, 220. In this showing the gripper jaws 486, 488 are represented as having started their movement to carry the first section f s toward the die 36 remote from the sheet cutting means. It will be noted that this section is larger than the section s in position over the die 36, the operator having so adjusted the preliminary feed member 50 as to increase the size of the first section for the purpose of taking care of the excess or waste piece at the forward end of the sheet. Since this section f s will be carried by the gripper members which have a definite movement, the forward edge of the section f s will extend beyond the edge of the section s shown in position above the die 36 and in this way the scrap or excess piece is cut off with the dieing-out operation on the first section. The feeding of the sheet S for all of the remaining sections is carried out solely through the gripping jaws 486, 488 and all of the sections except possibly the last will be uniform in size, for instance, such as that shown at s in this figure. After the operation of the die 36 to complete the cutting of the blank from the section s, the remaining portion r of this section is carried to the right in this figure into position over the die 38. It will be observed that the sections cut from the sheet S are of predetermined size and bear a definite relation to the size of the two blanks to be cut therefrom. This is true of all of the sections despite the fact that an occasional section is larger than the majority of sections, due to the method of disposition of the waste or excess piece at one or both ends of the sheet. It would indeed be possible to provide sheets of predetermined length so as to avoid cutting any but sections uniform in size. As pointed out above, however, in carrying out operations with due regard to the problems of the manufacturer, it has been found desirable to utilize sheets which are practically uniform in size and to make adjustments in the machine, and particularly in the dies and in the feeding mechanism, by which there may be cut, from sheets uniform in length, different predetermined numbers of blanks of various sizes, thus making unavoidable the production of a certain amount of scrap or excess material in cutting blanks of certain sizes. It will be noted, furthermore, that the sections s are made to produce two blanks with a minimum of waste by positioning the irregularly shaped blanks with the large end of one blank pointing in the opposite direction from the large end of the other blank. As a result of the dieing-out operation on the section s there is produced a blank B and at the same time the section is severed to produce a remainder r from which the second blank is died out. It will be clear that there is no problem involved in the disposal of the scrap since it is discharged downwardly at the same time that the blanks are forced into the dies and hence disposal of the scrap or excess piece at the forward end of the sheet by carrying it over with the first section possesses advantages that are obvious and important from the practical standpoint.

It will be apparent that if the dies and feeding mechanism were so arranged that the sections were fed first to the die nearer the cutting means, considerable difficulty in the feeding of sections and in the dieing out of blanks would be experienced. For example, if sections, each containing material enough for two blanks, were fed successively into position over the nearer die to have the first blank cut from each section and with the portion for the second blank overhanging on the side toward the farther die, an end section of a sheet of material, wide enough for the production of one blank only, would, in the normal operation of feeding mechanism, be positioned on the overhanging portion of the preceding section. This would result in imperfect cutting due to tilting of the sections upon descent of the mallet, and, since such an end section necessarily would be wider than one-half of a complete section, part of it would be cut and forced into the die as scrap. It is for the purpose of avoiding these difficulties that the dies and feeding mechanism in the illustrated machine are so arranged that sections are fed first to the die farther away from the cutting means and are then carried back to the nearer die in the manner which has been previously described. In the illustrated machine, in cases where sheets of material placed in the machine are of a length such that the last section cut from a sheet contains material sufficient to produce only one blank, such section will be carried over to the farther die 36 and a single blank will be cut therefrom in the same manner as the first blank is cut from a complete section.

The discharge mechanism referred to comprises in the illustrative construction a continuously running feed belt 636 one below each die, each belt being driven from a wheel 638 and both wheels being mounted on a shaft 640 mounted in bearings in the frame of the machine. While the shaft may be driven by any conveniently arranged connections with the power means for the machine, that shown comprises a gear 642 (Figs. 1 and 10) fast on the shaft 640 which is constantly in mesh with a bevel gear 644 at the upper end of an upright shaft 646 having at its lower end a gear 648 which is in mesh with a worm drive 650 fixedly mounted on a horizontal shaft 611 having at its other end a bevel gear 654 which is in mesh with a co-operating bevel gear 656 on the main shaft 243, which extends longitudinally at the rear of the machine. Through the connections thus described, the feed belts 636 are driven at a constant speed and operate to carry the blanks out of the machine to a delivery station where the blanks may be deposited if desired in a box or other receptacle. It may be convenient, however, for the operator to remove the blanks directly from the feed belts 636 upon which they are lying in overlapping relation, as indicated in Fig. 12 of the drawings, it being a matter of a second's time only to gather up a large stack of the blanks by simply sweeping them by the hands into a stack and depositing them in a receptacle provided for the purpose. While the blanks would naturally become stacked in the relationship shown in Fig. 12 by reason of the movement of the belts 636 and the constant discharge of blanks from above upon the belt as it is moving, means is preferably provided for facilitating such an arrangement of the blanks upon the feed belts, said means, in the construction shown, comprising a pair of pusher members 660, one for each belt, each pusher member being mounted at the upper end of a lever 662 and having its forward end resting upon the belt and reciprocable along the belt to assist in the proper stacking of the blanks thereon. Referring to Figs. 10, 11 and 12, it will be seen that the lever 662 is pivoted on the shaft 230 and carries at its lower end a roll 663 arranged to travel in the cam path 664 in the cam member 666 fast upon the shaft 243.

The operating means for the section feeding grippers 484 comprises, in the illustrative construction, the lever 94 which is operatively connected at its upper end to the rods 494 through a yoke member 668 (Figs. 1, 5 and 10) through a link 670 pivoted at one end of the central portion of the yoke 668 and at its other end to a bolt 672 swiveled in the upper end of a lever 674 which is pivoted at 676 to the upper end of the lever 94. Conveniently the central portion of the yoke 668 is enlarged and is provided with a groove or T-shaped slot to guide the yoke during reciprocation thereof a correspondingly shaped guide bar 678 (Figs. 1 and 10). As shown, the lever 94 is pivoted upon the shaft 604 and is provided with two arms 92, 680 carrying rolls 682, 684 respectively for engagement with cams on the peripheral cam wheels 686, 688 respectively mounted fixedly on shaft 611, it being understood that the provision of two arms on the lever 94 with rolls for operatively engaging the two cams is a construction that provides external cam faces which are less subject to wear than a cam path such as that shown at 608, a part of the operating means for the other section feeding mechanism. The cams 686 and 688 are so shaped that the rods 494 carrying the feed grippers 484, and operated by lever 94, are moved in two distinct steps for the purpose of effecting a dwell in the movement of the gripper feeding means 484 to permit of the operation of the cutters 34, 220 as described above, the movement of the lever 94 being subsequently such as to carry the section cut by the cutters from the sheet material to a position so that the forward end of the section bears always a predetermined relation to the far edge of the die 36, that is, the edge farthest from the cutters 34, 220.

As before stated, provision is made in accordance with this invention for operating upon sheets of material of different or of uniform lengths to produce blanks of different sizes and leave the minimum waste remainder. Preferably sheets uniform in length are provided in commercial operations. Accordingly, when the dies 36, 38 are the largest size designed to be used with the illustrated machine, the feeding mechanism comprising the feeding member 50 for projecting the sheet, the feeding mechanism comprising the lever 94 and the feeding mechanism comprising the lever 602 will all be adjusted if, just previously, dies of another size have been utilized in the cutting of blanks. The description of the adjustment of the feeding member 50 and of the feeding mechanism, which includes the lever 602, together with its feeding member 436, have already been described. It is clear that the means thus far described for operating the rods 494 and the gripping jaws 484 will take care of sections of a given dimension since the throw of the rods 494 by the means described is constant beginning at the platforms 588 (Fig. 16) where the gripper jaws 484 close upon the material and ending with the jaws releasing the section with its edge bearing a predetermined relation to the far edge of the die 36. In order to vary the feeding movement of the gripper jaws 484 so that a longer or shorter piece will be cut off from the sheet material by the cutters 34, 220, it is necessary to vary the speed of the feeding movement of the gripper jaws from the time they leave the platforms 588, where they grip the material, to the time of the dwell when the gripper jaws are at the other side of the cutter 34, it being obvious that if the gripper jaw move faster and farther during this period of the oscillation of the lever 94 up to the time of dwell caused by concentric portions on the cams 686, 688 that a longer portion of the sheet material will be drawn beyond the cutter 34 and hence that a longer section will be cut off when the cutters 34, 220 operate. Since, however, the forward edge of the section must always arrive at the same predetermined line with reference to the far edge of the die 36, increased movement of the gripper jaws to obtain the longer section must be subtracted before the jaws reach final position, otherwise the material would be projected varying distances beyond the far edge of the die 36.

The means for accomplishing the feeding and cutting of sections of different lengths comprises, in the construction shown, the lever 674, which is pivoted to the upper end of the lever 94, and means for moving the lever 674 with respect to the lever 94 to cause greater speed of movement of the bars 494 at the proper time. Referring to Fig. 1 of the drawings, it will be observed that the lever 674 has an arm 690 having a roll 692 which is movable along a selected cam slot 694, 696, 698, 700 in the adjustable cam wheel 702. It will be clear that if the shape of one of these cam slots in the wheel 702 is such that it is concentric with respect to the shaft 604 that the lever 674 will act simply as an extension of the lever 94, in other words, as if the lever 94 out to the connection with the link 670 were a single piece lever, and this is the case when cam slot 700 is in operative position. If, on the other hand, during movement of the lever 94 toward the left in Fig. 1, the roll 692 on the lever arm 690 be moved upwardly in a cam slot such as that shown at 694 and at 696, it is clear that the upper end of the lever 674 is given an accelerated movement over that which is caused by the movement of the lever 94 alone. In the position of the parts shown in Fig. 1 of the drawings, the lever 94 is almost at the limit of its throw toward the right and the gripper jaws are just about to be tripped to grasp the projected end of the lowermost sheet in the magazine. Upon movement then of the lever 94 toward the left in Fig. 1 the lever 674, besides moving with the lever 94, will be given a tipping motion toward the left thereby accelerating the movement of the rods 494 and the gripper jaws carried thereby at a time during the first part of the feeding movement of said rods, that is, up to the time of the dwell, this accelerated movement of the lever 674 being due to the roll 692 riding up on the high part of the cam slot 694, which is similar to, though a little higher than the high part of the cam 696 shown in full lines in the said figure. Just at the time when the roll 692 is at the high point of the cam slot 694 the dwell occurs, and the cutters 34, 220 operate to cut off the largest section for which this particular machine is constructed. On movement of the lever 94 following the dwell, the roll 692 moves down the other side of the high point of the cam slot 694 thereby subtracting, in a sense, the increased movement of the rods 494 so that on the completion of the movement of the lever 94 toward the left the gripper jaws 484 will stop at the left extreme position with the material in predetermined relation to the far edge of the die 36. During the latter part of this movement the roll 692 is travelling in a portion of the slot 694 which is concentric with the shaft 604 and then enters the slot 704 in a stationary part or bracket fastened to the machine frame. When it is desired to cut the next smaller section the pin 706 is withdrawn unlocking the wheel 702 so that it may be turned to bring the slot 696 into alinement with the slot 704, it being necessary, of course, that the machine be stopped in such position that the roll 692 on the lever arm 690 is resting in the slot 704. When the wheel 702 is adjusted so that the slot 700 is in alinement with the slot 704 no movement of the lever 674 with respect to movement of the lever 94 takes place, both levers acting as one lever and in this case the shortest section designed to be cut by the machine as constructed will be produced and presented to the die for the production of blanks. Preferably a rotatable member 707 is used to clamp the cam wheel 702 in position, in addition to the latch 706, after it has been adjusted by turning hand wheel 709.

As a matter of convenience, the driving means for the machine may be an electric motor 710 (Fig. 1) having an armature shaft 712 upon which is mounted a gear 714 in mesh with a gear 716 mounted upon a sleeve 717 to turn loosely on a stub shaft 718 fixed in a bearing in the frame of the machine, said gear 716 being secured to a gear 720 through fixed attachment to the sleeve 717 which is integral with or fixedly secured to the gear 720. The gear 720 is in mesh with the gear 722 fixed to the main shaft 243 of the machine. In order to obviate breakage of the parts of the machine in case the feeding mechanism should encounter an obstruction due to any cause whatever, such for instance as damaged or distorted material which refuses to conform to the passageways during feeding operations, or to the presence of accidentally introduced objects or material having the effect of stalling or limiting the movement of the feeding parts, there is provided, in conection with one of the driving gears, a construction which permits relative movement or slipping of the parts of the gear. In the construction shown the gear 716 (Fig. 4) has its peripheral portion 724 separate from a central hub portion 726, the latter having a flange portion 728 adapted to lie against one face of the outer or peripheral portion 724, an annular member 730 being provided to lie against the other face of the portion 724 and being constructed as a separate member adapted to be yieldably connected to the hub portion 726 through a plurality of bolts 732 passing through the hub portion and through the annular member 730 and having springs 734 which press upon the annular member 730 and hold it yieldingly clamped against one surface of the peripheral portion 724. If desired, friction pads 736 are provided between each of the flanges 728, 730 and the corresponding surface of the intermediate portion of the member 724. It will be clear that in case of unusual obstruction in the machine that the peripheral portion 724 of the gear 716 may move relatively to the hub portion 726, thus giving the operator time to switch off the power before any serious damage to the machine can take place.

As before stated, in commercial operations with a machine constructed in accordance with this invention, it is preferable to provide sheets of material of uniform length from which there may be died out blanks of different sizes by changing the dies to the size desired and by making corresponding adjustments in the feed mechanisms. For example, in the manufacture of fillers for shoe soles, it has been found desirable to provide sheets of material 42½ inches in length from which, by making suitable adjustments and changes, there may be cut ten sections $4\frac{3}{16}$ inches in length, or nine sections $4\frac{21}{32}$ inches in length, or eight sections each of which is 5⅛ inches in length. If, for instance, the largest size of die is used, eight blanks will be cut from the strip or sheet, leaving a waste of approximately 1½ inches. It will be understood, however, that this 1½ inch of waste material is not all at either or both ends of the strip or sheet of material, since it is necessary to cut the sections, from which the blanks are to be died out, a little larger than the greatest width of the die so that with each section there is a very small amount of waste. However, it is necessary to provide for taking care of a small amount of waste or remnant piece at one or both ends of the sheet. It is preferable that the waste shall be cut off with the first section cut from the sheet through the operation of the cutters 34, 220 and hence the first section, when it is carried to the die 36, will have its forward edge projecting beyond the die farther than that of any of the other sections which are cut from the same sheet. In order to project the sheet S from the magazine 30 such a distance as to place practically all of the waste at the forward end of the first section, it is necessary to adjust, as before described, the feed member 50 by proper manipulation of the knurled wheel 60. It will be understood that the shoulder 52 on the feed member 50, when the latter is in its initial position at the extreme right of the throw of the feed carriage, is located beyond the end wall of the magazine which defines the position of the sheets in the magazine so as to insure that the shoulder 52 will engage the end of the lowermost sheet, and thus there is always a certain amount of lost motion of the feeder member 50 before the shoulder 52 will engage the end of the sheet. This is clearly illustrated in Fig. 21 of the drawings. It will be obvious that an adjustment of the feeder member 50 to the right in the said figure will move the shoulder 52 farther away from the end of the lowermost sheet and that there will, therefore, be a greater amount of lost motion for the feeder member 50 before it becomes operative to engage and feed the sheet, and hence in this latter case a shorter section of the advance end of the sheet will be projected from the magazine.

On the other hand, the nearer the shoulder 52 is adjusted to the inside face of the end wall of the magazine the less will be the lost motion of the feeder member 50 and the greater will be the length of the section at the advance end of the sheet, it being understood that the throw of the feeder member and its carriage 62 is constant. At the same time that the feeder member 50 is adjusted through manipulation of the knurled wheel 60 to take care of the 1½ inches of waste by bringing the shoulder 52 up close to the end of the sheet, when eight blanks are to be cut from the sheet, it is necessary also to adjust the sleeve 110 so as to position the proper ratchet wheel 130 for the operation of the pawl 134, thereby insuring that the forward end of the lowermost sheet will be projected by the feeder member 50 and that no further projection of any sheet will take place until the ninth successive reciprocation of the feeder member 50, when the next sheet will be projected from the magazine. Inasmuch as the feed members must in practice be allowed a small error in the feeding operations, it follows that some excess of material must be provided in the length of the sheets from which a plurality of blanks is to be cut and hence the mechanism as above described is provided to take care of the remnant pieces at both of the forward and rear ends of the sheets, the remnant piece, if any, at the rear end of the sheet being withdrawn from the line of feed of the material by the V-shaped members 260 on the lower cutter 34, as above described. In arranging for the cutting of eight blanks from the sheets in the magazine, the cam wheel 702 is adjusted to bring the slot 694 in position for engagement with the roll 692 on the lever 674 and corresponding adjustments will be made in the feed mechanism (Fig. 2) which operates the feed slide 590, the latter carrying the feeding member 436, as above described. After the desired adjustments have been made, all that is necessary is to keep the magazine 30 supplied with sheets of material of which there should never be less than a certain predetermined number in the magazine. It will be recalled that the feed member 50 will be rendered inoperative if the number of sheets in the magazine becomes less than three or four, as determined by the operator in setting the connections between the weighted member 188 and the fingers 194, which, under certain conditions, lift the sheets at their rear ends away from the feeder member 50. At the other end of the machine the blanks drop from the dies upon the feed belts 636 and are carried to receptacles or may be removed and stacked by the operator.

Having thus described my invention, what I claim as new and desire to secure by Letters Patent of the United States is:

1. In a machine of the character described, means for positioning a sheet of material to be fed, cutting means for sheet material, and a single feeding means for feeding the sheet of material to the cutting means and the severed piece away from the cutting means in steps of unequal length whereby the sheet material may be moved a relatively slight distance to the cutting means and the severed section a greater distance to a discharge station.

2. In a machine of the character described, means for positioning a sheet of material to be cut, cutting means for operating on sheet material to sever sections successively from one end thereof, a tool for operating on the sections, and a reciprocatory feeding means for gripping the sheet to feed it into cutting position and to carry the severed sections in succession to the tool, whereby the sections are maintained positively under control from the time they are cut until the operation of the tool.

3. In a machine of the character described, a support for sheet material, cutting means for operating on the material to sever sections therefrom, feeding means for moving the sheet material to the cutting means and by a continuation of the feeding movement thereafter moving the severed sections to a discharge station, and means for operating the feeding means to produce a dwell in the movement of the latter while the cutting takes place.

4. In a machine of the character described, a support for sheet material, cutting means for dividing the sheet material into sections, a die for cutting blanks from the sections, and a feeding member operative to move the sheet into cutting position relatively to the cutting means and thereafter to move the severed sections in succession into dieing out position relatively to said die.

5. In a machine of the character described, cutting means for dividing sheet material into sections, a die for dieing out blanks from the sections, feeding means for moving the sheet material into cutting relation to the cutting means and the sections into dieing-out relation to the die, the construction and arrangement being such that the feeding means positions the advance edge of each section in a predetermined relation to the far edge of the die, and means for accelerating a portion of the movement of the feeding means so as to provide a larger section for the operation of the die than would be provided by the feeding means at its normal rate of operation.

6. In a machine of the character described, a support for sheet material, cutting means for dividing the sheet material into sections, a die for dieing out blanks from the sections, feeding means for moving the sheet material into cutting relation to the cutting means, and the sections into dieing-out relation to the die, the construction and arrangement being such that the feeding means progresses the advance edge of each section into a predetermined relation to the far edge of the die, and means under the control of the operator and automatically operative for accelerating the movement of the feeding means for a part of its feeding movement, thereby determining the size of the section to be cut by the cutting means.

7. In a machine of the character described, a support for sheet material, cutting means for severing the material into sections located at a predetermined distance from the support, and means movable at variable rates of speed to present the material to the cutting means and to carry the sections to a discharge station.

8. In a machine of the character described, means for supporting a sheet of material, cutting means located at a definite distance from the support for cutting the material into sections, a die located in the line of feed of the material beyond the cutting means, and feeding mechanism for the sheet material for moving a sheet into position with respect to the cutting means constructed and arranged to dwell while the cutting operation takes place and to continue in movement with the severed section to position the same in predetermined relation to the die so that a blank may be cut from the section.

9. In a machine of the character described, a cutting means for cutting sheet material into sections, feeding means for projecting a sheet of material toward the cutting means, and a second feeding means movable past the cutting means to seize the projected sheet and to draw its advanced end past the cutting means upon reverse movement of the second mentioned feeding means so that upon operation of the cutting means the second mentioned feeding means may carry the severed section to a discharge station.

10. In a machine of the character described, a support for sheet material, cutters for cutting sections from the material, a plurality of dies located one after the other in the line of feed of the material, and feeding means for presenting the material to the cutters to have sections cut therefrom and for subsequently presenting the sections first to one die and then to another to have a plurality of blanks cut from each section.

11. In a machine of the character described, a plurality of dies arranged at different levels, and feeding means for sheet material operative to present the material first to one die at one level and then to another die at a different level whereby a plurality of blanks is cut from the material.

12. In a machine of the character described, a plurality of dies, feeding means for moving a piece of material to one die to have a blank cut therefrom, and other feeding means for moving the remainder of the piece of material to another die to have another blank cut from the same piece.

13. In a machine of the character described, a plurality of dies, feeding means for gripping and carrying a piece of material to one die, and a second feeding means for carrying a piece of material in the opposite direction to another die, and means for causing simultaneous operation of the dies to cut blanks from the pieces of material.

14. In a machine of the character described, a support for a sheet of material, cutting means for cutting sections from the material, a plurality of dies, means for feeding the severed section to one of the dies to have a blank cut therefrom, and means for feeding the remainder of the section to another die for a dieing out operation.

15. In a machine of the character described, a support for a sheet of material, cutting means for the material located at a predetermined distance from the support, means on one side of the cutting means for projecting the sheet toward the cutting means, and a second means movable toward and from the cutting means from the other side thereof for moving the sheet of material step by step past the cutting means, the construction and arrangement being such that a section is cut from the sheet at the end of each feeding step.

16. In a machine of the class described, a support for sheet material, cutting means spaced from the support a predetermined distance, a die beyond the cutting means in the direction of feed of the material, and means for feeding the material to the cutting means to have sections cut therefrom and for carrying the sections one by one to the die where blanks are died from the sections.

17. In a machine of the character described, means for positioning a sheet of material to be fed, cutting means for sheet material, and a single feeding means reciprocable across the plane of the cutting means for feeding the material to the cutting means and the severed piece away from the cutting means in successive steps whereby the sheet material may be moved to the cutting means and the severed section to a discharge station.

18. In a machine of the character described, a support for sheet material, cutting means for operating on the material, feeding means reciprocable across the plane of the cutting operation for moving the sheet material to the cutting means and for thereafter moving the severed piece to a discharge station, and means for operating the feeding means to produce a dwell in the movement of the latter while the cutting takes place.

19. In a machine of the character described, a support for sheet material, cutting means for dividing the sheet material into sections, a die for cutting blanks from the sections, and a reciprocatory feeding means operative to move the sheet into cutting position relatively to the cutting means and thereafter to move the severed section into dieing out position relatively to said die.

20. In a machine of the character described, a support for sheet material, cutting means for dividing the sheet material into sections, means associated with the support for positioning the material thereon at a predetermined distance from the cutting means, a die for dieing out blanks from the sections, feeding means for moving the sheet material into cutting relation to the cutting means and the sections into dieing-out relation to the die, the construction and arrangement being such that the feeding means carries the advance edge of each section always into a predetermined relation to the far edge of the die, and means under the control of the operator for accelerating a portion of the movement of the feeding means so as to provide a larger section for the operation of the die than would be provided by the feeding means at its normal rate of operation.

21. In a machine of the character described, a support for sheet material, cutting means for dividing the sheet material into sections, a die for dieing out blanks from the sections, feeding means for moving the sheet material into cutting relation to the cutting means and the sections into dieing-out relation to the die, the construction and arrangement being such that the feeding means positions the advance edge of the section always at a predetermined relation to the far edge of the die, and adjustable means for accelerating the movement of the feeding means for a part of its feeding movement, thereby determining the size of the section to be cut by the cutting means.

22. In a machine of the character described, a magazine for sheet material, cutting means for the material located at a predetermined distance from the magazine, and means movable at variable rates of speed to move the material from the magazine to present it to the cutting means and to carry the severed pieces to a discharge station.

23. In a machine of the character described, cutting means for severing sheet material into sections, means for positioning the material with respect to the cutting means, a die located in the line of feed of the material beyond the cutting means, and feeding mechanism for the sheet material for moving a sheet into position with respect to the cutting means constructed and arranged to dwell while the cutting operation takes place and to continue in movement with the severed section to position the same in predetermined relation to the die so that a blank may be cut from the section.

24. In a machine of the character described, a support for sheet material, a cutting means located at a predetermined distance from the support, feeding means for projecting a sheet of material toward the cutting means, and a second feeding means movable past the cutting means to seize the projected sheet and to draw its advanced end past the cutting means upon reverse movement of the second-mentioned feeding means so that upon operation of the cutting means the second-mentioned feeding means may carry the severed section to a discharge station.

25. In a machine of the class described, a cutting means for cutting sheet material into sections, and a reciprocable feeding means movable past the cutting means to seize a sheet of material, and again past the cutting means in the reverse direction to move the sheet into the field of operation of the cutting means.

26. In a machine of the class described, a cutting means for cutting sheet material into sections, and a reciprocable feeding means movable past the cutting means to seize a sheet of material, and again past the cutting means in the reverse direction to move the sheet into the field of operation of the cutting means and to carry the section just severed to a discharge station.

27. In a machine of the character described, cutting means for cutting sections from sheet material, a plurality of dies, and feeding means for presenting the material to the cutting means to have sections cut therefrom and for subsequently presenting the sections first to one die and then to another to have a plurality of blanks cut from the sections.

28. In a machine of the character described, a plurality of dies located at different levels one after another in the line of feed of material to be operated on by the dies, and feeding means for the sheet material operative to present the material first to one die and then to another die at a lower level whereby a plurality of blanks is cut from the material.

29. In a machine of the character described, a plurality of dies arranged at different levels, feeding means operating in a given plane for carrying a piece of material to one die to have a blank cut therefrom, and other feeding means operating in a plane lower than that mentioned for carrying the remainder of the piece of material to another die at a lower level to have another blank cut from the same piece.

30. In a machine of the character described, a plurality of dies, feeding means for moving a piece of material in one direction to one die to have a blank cut therefrom, and a second feeding means for moving the remainder of the piece of material in the opposite direction to another die, and means for causing simultaneous operation of the dies to cut blanks from pieces of material.

31. In a machine of the character described, a support for a sheet of material, cutting means for cutting sections from the material, a plurality of dies, means for feeding the severed sections to one of the dies to have a blank cut therefrom, means for feeding the remainder of each section to another die for a dieing out operation, and means for simultaneously operating the dies.

32. In a machine of the character described, a support for sheet material, cutting means for the material located at a predetermined distance from the support, means for projecting the material toward the cutting means, and a second means for moving the material past the cutting means to have sections cut from the sheet material.

33. In a machine of the class described, a support for sheet material, a cutter spaced from the support a predetermined distance, a die beyond the cutter in the direction of feed of the material, a reciprocable member having grippers for feeding the material to the cutter to have sections cut therefrom and for carrying the sections one by one to the die where blanks are died from the sections.

34. In a machine of the class described, a plurality of dies, a cutter for cutting sections from sheet material, and means for feeding the sections to one die and then to another to have a plurality of blanks cut from the sections.

35. In a machine of the class described, a magazine for sheet material, means for feeding sheets one at a time from the magazine, a cutter operative to cut each sheet into sections, and dies operating in succession for cutting blanks from the sections thus produced.

36. In a machine of the class described, a magazine for sheet material, means for projecting sheet material from the magazine, a cutter for cutting each sheet of material into sections, a die operative to cut blanks from the sections, and a feeder mechanism operative to seize the projected sheet, feed it to the cutter, and carry each section as it is cut to the die.

37. In a machine of the character described, a magazine for sheet material, a cutter, means for feeding each sheet in successive steps to the cutter whereby each sheet is cut into sections, a plurality of dies arranged in the line of feed of the material with the like ends of the dies pointing alternately in opposite directions, and means for feeding the sections to the dies for the cutting of blanks from the sections.

38. In a machine of the character described, cutting means, means for feeding sheet material to the cutting means whereby the sheet material is cut into sections, a plurality of like dies arranged with their like ends pointing alternately in opposite directions, and means for carrying the sections into position over the dies so that blanks may be cut therefrom.

39. In a machine of the character described, cutting means for operating on sheet material, means for feeding sheet material to the cutting means and co-operating therewith for the cutting of each sheet into a plurality of sections, and a plurality of dies for operating on the sections to cut blanks therefrom, said feeding means comprising a gripper member operative to seize the sheet material to feed it to the cutting means and the severed section to one of the dies.

40. In a machine of the character described, cutting means for operating on sheet material, means for feeding sheet material in successive steps to the cutting means whereby each sheet is cut into sections, a plurality of dies, means for feeding the sections one at a time into cutting position with respect to the dies, and means co-operating with the dies to cut blanks from the sections.

41. In a machine of the character described, cutting means for operating on sheet material, means for feeding sheet material in successive steps to the cutting means to have sections of predetermined size cut from the sheet material, a plurality of dies, means for feeding each section immediately after it is cut into position over one of the dies to have a blank cut therefrom, and means for moving the remainder of that section into position over another die to have another blank cut therefrom.

42. In a machine of the character described, cutting means for sheet material, means co-operating therewith for cutting each sheet of material into sections of predetermined size, a plurality of dies, and means for feeding each successive section as it is cut from the sheet into position first over one die and then over another to cut a predetermined number of blanks from each section.

43. In a machine of the character described, cutting means for operating on sheet material, means co-operating with the cutting means for cutting each sheet of material into sections of predetermined size, a plurality of dies, means for feeding each section as it is cut from the sheet into position over one die to have a blank cut therefrom, and means simultaneously operable with the first feeding means to position the remaining portion of a previous section over a second die to have a second blank cut from that section.

44. In a machine of the character described, cutting means for cutting sheet material into sections, and means for dieing out a plurality of blanks from each section.

45. In a machine of the character described, cutting means for cutting sheets of material into sections of predetermined size, and a plurality of dies, arranged in line with the direction of movement of the material, for dieing out blanks from each section.

46. In a machine of the character described, cutting means for cutting sheet material into sections of predetermined size, and a plurality of dies operative to cut blanks in succession from each of said sections.

47. In a machine of the character described, cutting means for operating on sheet material to cut sections therefrom, means for feeding each section in turn from the cutting means to a dieing out station, a die at said station for cutting a blank from the section, and a second die for cutting another blank from the remainder of the said section.

48. In a machine of the character described, cutting means for operating on sheet material to cut sections therefrom, means for feeding the sheet material to the cutting means in successive steps, a plurality of dies located in line with the feeding means, means for feeding each section to the die remote from the cutting means to have a blank cut therefrom, and means for returning the remainder of that section into position over the die adjacent to the cutting means to have a blank cut from said remainder of the section.

49. In a machine of the character described cutting means for sheet material, means for feeding the sheet of material to the cutting means to cut the sheet into sections of predetermined size a plurality of dies located beyond the cutting means in line with the path of the sheet as it is fed to the cutting means, means for feeding each section as it is cut into position above the die remote from the cutting means to have a blank cut therefrom, and means for subsequently feeding the remainder of that section into position over the die adjacent to the cutting means to have another blank cut from said remainder, the construction and arrangement being such that blanks are cut simultaneously by the dies from two different sections.

50. In a machine of the character described, a magazine for sheet material, cutting means for operating on sheet material, means for projecting the lowermost sheet from the magazine in a direction toward the cutting means, a die located beyond the cutting means, means for seizing the end of the sheet and moving it through the plane of cutting operations into position to have a section cut therefrom by the cutting means, the sheet-moving means being then operative to feed the section into position over the die to have a blank cut from the section.

51. In a machine of the character described, cutting means for operating on sheet material, feeding means for moving a sheet of material into position to have a section cut therefrom by the cutting means constructed and arranged to continue its movement with the section to a dieing out station, and a die at the station for cutting a blank from the section.

52. In a machine of the character described, cutting means for operating on sheet material to cut sections therefrom, feeding means operative to seize the advance end of a sheet of material, and to project it beyond the cutting plane of the cutting means a distance corresponding to a dimension of the section to be cut, so that upon operation of the cutting means a section of predetermined size is cut from the sheet material, said feeding means being then movable to carry the section to a dieing out station, and a die at said station for cutting a blank from the section.

53. In a machine for cutting sheet material into blanks, a magazine for sheet material, means for feeding sheets in succession from the magazine, and means for rendering the feeding means inoperative while there is a predetermined minimum number of sheets still in the magazine and without interfering with cutting operations on the sheet previously fed.

54. In a machine of the character described, a magazine for sheet material, comprising an end wall for holding all but the lowermost sheet or sheets against movement in the feeding direction, the lower end of the end wall and the portion of the floor of the magazine directly subjacent the end wall being constructed and arranged to provide a space at the transverse center of the magazine of a depth just sufficient to permit the passage of a predetermined number of sheets, other portions of the end wall being flared with respect to the floor so as to accommodate and direct the passage of corrugated or otherwise distorted sheets of material from the magazine.

55. In a machine of the character described, a magazine for sheet material having an end wall for preventing all but the lowermost sheet or sheets from passing through the exit opening in the direction of feeding movement of the material, and guiding means for directing the forward end of the sheet or sheets under the end wall of the magazine and through the exit opening.

56. In a machine of the character described, a magazine for sheet material having an end wall for preventing all but the lowermost sheet or sheets from passing in the direction of feeding movement of the material, the floor of the magazine directly under the end wall being constructed to present a high, central portion spaced from the end wall a distance just sufficient to permit of the passage of a predetermined number of sheets, and means for pressing the sheets firmly upon said high portion of the floor of the magazine, the floor of the magazine on each side of the high portion being constructed to be inclined away from the high portion to serve as supporting guideways for the lateral portions of the front end of the sheet.

57. In a machine of the class described, a magazine for sheet material, means for feeding sheets from the magazine, cutting means operative to cut the material into sections, and a die for cutting blanks from the sections thus produced.

58. In a machine of the class described, a magazine for sheet material, means for projecting sheet material from the magazine, cutting means for cutting the sheet material into sections, a die operative to cut blanks from the sections, and feeding means operative to seize the projected sheet material, feed it to the cutting means, and carry the sections to the die.

59. In a machine of the character described, a magazine for sheet material, cutting means, means for feeding each sheet in successive steps to the cutting means whereby each sheet is cut into sections, a plurality of dies arranged in the line of feed of the material, and means for feeding the sections to the dies for the cutting of blanks from the sections.

60. In a machine of the character described, a cutter, means for feeding a sheet of material in successive steps to the cutter whereby the sheet is cut into sections, a plurality of like dies arranged to have the distinctive end of one die pointing in a different direction from the similar end of an adjacent die, and means for carrying the sections into operative position with respect to the dies so that blanks may be cut therefrom.

61. In a machine of the character described, cutting means for operating on sheet material, means for feeding sheet material to the cutting means and co-operating therewith for the cutting of the sheet material into a plurality of sections of predetermined size, and a plurality of dies for operating on the sections to cut from each section as many blanks as there are dies.

62. In a machine of the character described, a cutter for operating on sheet material, means comprising a reciprocable member for feeding sheet material in successive steps to the cutter whereby each sheet is cut into sections, a plurality of dies, means comprising said member for feeding the sections into cutting position with respect to the dies, and means co-operating with the dies to cut blanks from the sections.

63. In a machine of the character described, a cutter for operating on sheet material, a reciprocable member for feeding sheet material in successive steps to the cutter to have sections of predetermined size cut from the sheet material, a plurality of dies, said reciprocable member being operative for feeding each section immediately after it is cut into position over one of the dies to have a blank cut therefrom, and means for moving the remainder of that section into position over another die to have another blank cut therefrom.

64. In a machine of the character described, a cutter for sheet material, means comprising a reciprocable feeder member for co-operating therewith for cutting each sheet of material into sections of predetermined size, a plurality of dies arranged in the line of feed of the material, and means for feeding each successive section as it is cut from the sheet into position first over one die and then over another to cut a predetermined number of blanks from each section.

65. In a machine of the character described, a cutter for operating on sheet material, a reciprocable feed member for co-operating with the cutter for cutting each sheet of material into sections of predetermined size, a plurality of dies, said feed member being operative for feeding each section as it is cut from the sheet into position over one die to have a blank cut therefrom, and a second feed member simultaneously operable with the first feed member to position the remaining portion of a previous section over a second die to have a second blank cut from that section.

66. In a machine of the character described, cutting means for cutting sheet material into sections, and a plurality of dies for dieing out blanks from each severed section.

67. In a machine of the character described, cutting means for cutting sheet material into sections of predetermined size, and means comprising a plurality of stationary dies operating to cut blanks in succession from the severed sections.

68. In a machine of the character described, a magazine for sheet material, means for feeding the lowermost sheet from the magazine, and means controlled by the stack of sheets in the magazine for moving the sheets away from the feeding means thus rendering the latter inoperative to feed the sheets when the number of sheets in the magazine has been reduced to a predetermined minimum.

69. In a machine of the character described, a magazine for sheet material, comprising an end wall for holding all but the lowermost sheet against movement in the feeding direction, the lower end of the end wall and the portion of the floor of the magazine directly subjacent the end wall being constructed and arranged to provide a space at the transverse center of the magazine of a depth just sufficient to permit the passage of a sheet, other portions of the end wall and floor being flared with respect to each other so as to direct corrugated, bent, or otherwise distorted sheets of material to the exit opening of the magazine.

70. In a machine of the character described, a magazine for sheet material having an end wall for preventing all but the lowermost sheet from passing in the direction of feeding movement of the material, the floor of the magazine directly under the end wall being constructed to present inclined portions which direct the side edges of the sheet to the exit opening and a high central portion directly below the end wall spaced from the end wall a distance just sufficient to permit of the passage of a single sheet.

71. In a machine of the character described, a magazine for sheet material having an end wall for preventing all but the lowermost sheet from passing in the direction of feeding movement of the material, the floor of the magazine directly under the end wall being constructed to present a high, central portion directly below the end wall spaced from the end wall a distance just sufficient to permit of the passage of a single sheet, and a weighted member for pressing the sheets firmly upon said high portion of the floor of the magazine.

72. In a machine of the character described, a magazine for sheet material, means for feeding the sheets from the magazine, and a member resting upon the sheets in the magazine and having connections operative to displace the feeding means and the sheets relatively to each other so as to prevent feeding of the sheets when the number in the magazine has been reduced to a predetermined minimum.

73. In a machine of the character described, a magizine for sheet material, means for feeding the lowermost sheet from the magazine, and a member resting upon the sheets in the magazine and having connections to the feeding means operative to prevent effective operation of the latter when the number of sheets in the magazine has been reduced to a predetermined minimum.

74. In a machine of the character described, means for cutting sheet material into sections, means for cutting blanks from the sections, feeding means for feeding the sheet material to the cutting means constructed to dwell during the cutting operation and operative also to feed the several sections to the blank cutting means, and means for varying the movement of the feeding means up to the time of the dwell to provide sections of various sizes from the sheet material.

75. In a machine of the character described, a support for sheet material, cutting means located at a predetermined distance from the support for cutting the sheet material into sections, a die located beyond the cutting means in the direction of feed of the sheet material, and having its farther edge located always at a predetermined distance from the cutting means, feeding means for moving a sheet of material along the support to the cutting means to have sections cut therefrom, the said feeding means being also operative to carry the sections to the die with the advance edge of each section properly located with respect to the farther edge of the die, and means for operating the feeding means to accelerate the feeding movement of the feeding means while it is moving the sheet, and to cause a dwell while the cutting means operates, and to move the feeding means always through the same predetermined distance whereby the section is properly positioned over the die for the dieing out operation.

76. In a machine of the character described, a support for sheet material, cutting means located at a predetermined distance from the support for cutting sheets into sections, a die having its farther edge located at a predetermined distance from the cutting means, a feed mechanism for moving the sheet to the cutting means and for carrying the section cut from the sheet into position over the die, and means for accelerating the feeding means during the feeding of the sheet to produce in co-operation with the cutting means a section greater than the minimum section, operative subsequently to slow up the feeding means an amount corresponding to the acceleration so as to position the advance end of the section always in the same predetermined relation to the farther edge of the die.

77. In a machine of the character described, cutting means for cutting sections from sheet material, a die for dieing out blanks from the sections, feeding means movable between fixed points and operative to move the sheet to the cutting means and the sections to the die, and means for accelerating the feeding means to feed a section greater than the minimum section for which the machine is designed.

78. In a machine of the character described, cutting means for cutting sections from sheet material, a die for dieing out blanks from the sections, a feeding means movable between fixed points and operative to move the sheet to the cutting means and the sections to the die, and means under the control of the operator for causing an acceleration of the feeding means to provide a series of sections greater than the minimum section for which the machine is designed.

79. In a machine of the character described, cutting means for cutting sections from sheet material, a die for dieing out blanks from the sections, feeding means movable between fixed points and operative to move the sheet to the cutting means and the sections to the die, and means under the control of the operator and automatically operative for causing an acceleration of the movement of the feeding means to produce a series of sections greater than the minimum section for which the machine is designed.

80. In a machine of the character described, cutting means for cutting sections from sheet material, a die for dieing out blanks from the sections, feeding means movable between fixed points and operative to move the sheet to the cutting means and to dwell during the cutting operation and operative also to move the sections to the die, and means comprising a plurality of cams for causing selectively acceleration of the feeding means to produce a series of sections differing in size.

81. In a machine of the character described, a support for a sheet material, cutting means located a predetermined distance from the support and operative to cut the material into sections, a die for cutting blanks from the sections, a reciprocable feed member for feeding the sheets to the cutting means and the sections to the die, a lever for operating the feed member, said lever having a movable part, and means for operating on the movable part to accelerate the movement of the feed member while it is advancing the sheet to the cutting means to produce sections longer than the minimum section for which the machine is designed.

82. In a machine of the character described, a support for a sheet material, cutting means located a predetermined distance from the support and operative to cut the material into sections, a die for cutting blanks from the sections, a reciprocable feed member for feeding the sheets to the cutting means and the sections to the die, and a cam member for causing an accelerated movement of the feed member while the latter is feeding the sheet to the cutting means.

83. In a machine of the character described, means for cutting sheet material into sections, a plurality of dies, and means for feeding sheets to the cutting means and the severed sections to the dies to have blanks cut therefrom.

84. In a machine of the character described, means for cutting sheets of material into sections, a plurality of dies in a row, and means movable along the row for simultaneously feeding sectioned material to the several dies.

85. In a machine of the character described, means for cutting sheet material into sections, a plurality of dies, means for gripping the sections and feeding them to the dies, and means for causing simultaneously operation of the dies to cut blanks from the sections.

86. In a machine of the character described, means for cutting sections from sheet material, a plurality of dies, means for feeding the sections to one die to have blanks cut therefrom, and means for feeding the remainder of each section after operation thereon by one die into operative relation to another die whereby a plurality of blanks is produced from each section.

87. In a machine of the character described, means for cutting sections from sheet material, a plurality of dies, means for feeding sections to one die to have blanks cut therefrom, means for feeding the remainder of each section after operation of the first die into dieing-out relation with respect to another die, and means for simultaneously operating the dies.

88. In a machine of the character described, means for cutting sections from sheet material, a plurality of dies for operating on the material of the sections, and feed members movable in opposite directions in planes one above the other for moving sheet material of the sections into position over the dies.

89. In a machine of the character decribed, means for cutting sections from sheet material, a plurality of dies for operating on the material of each section, feeding means simultaneously operable for positioning the material of the sections in dieing-out relation with the dies, and means for causing simultaneously operation of the dies to cut blanks from the sections.

90. In a machine of the character described, means for cutting sections from sheet material, a plurality of dies, means for moving the sections over the die remote from the cutting means to have blanks cut therefrom, and means simultaneously operable for moving the remaining portion of each section into operative relation to the die adjacent the cutting means, and means for simultaneously operating the dies.

91. In a machine of the character described, a plurality of dies for operating on sections of sheet material, a feed member for moving each section into dieing out relation to one of the dies, means for simultaneously moving the severed remaining portion of each section after the operation of the first die into dieing out relation to a second die, and means for operating the dies.

92. In a machine of the character described, a plurality of dies for operating on sections of sheet material, a feed member for moving the sections into dieing out relation to one of the dies, means for simultaneously moving the severed remaining portion of each section after the operation of the first die into dieing-out relation to a second die, and means for simultaneously operating the dies.

93. In a machine of the character described, a plurality of dies, a mallet for forcing the material upon the dies, feeding means for positioning sheet material over the dies, and means associated with each die for holding the material in the position to which it has been advanced by the feeding means as the feeding means releases the material prior to an operation of the mallet.

94. In a machine of the character described, a plurality of dies, a mallet for forcing the material upon the dies, feeding means for positioning sheet material over the dies, and means associated with each die and arranged to be controlled by the feeding means for holding the material in the position to which it has been advanced by the feeding means while the latter releases the material prior to the operation of the mallet.

95. In a machine of the character described, a plurality of dies, a mallet for forcing the material upon the cutting edges of the dies, feeding means movable in opposite directions to present sheet material in dieing-out position with respect to both dies, sheet holding means associated with each die for holding the material in the position to which it has been advanced by the feeding means and operative while the material is being released by the feeding means prior to the operation of the mallet.

96. In a machine of the character described, a die and a mallet relatively movable to force sheet material upon the cutting edge of the die, and a presser foot associated with the mallet for clamping the material upon the die prior to the operation of the mallet.

97. In a machine of the character described, a die and a mallet relatively movable to force sheet material upon the die, said mallet having a recess in its operative face, and a presser foot for clamping the material upon the die prior to the operation of the mallet and arranged to fill the recess so that the mallet and the presser foot present a smooth surface effective to force the material upon the cutting edge of the die.

98. In a machine of the character described, a die and a mallet relatively movable toward and from each other to force sheet material upon the cutting edge of the die, means for feeding sheet material into position between the die and the mallet, a presser foot for clamping the material upon the die, and means for tripping the presser foot just as the feeding means releases the material so that the material is held in proper position for the dieing out operation.

99. In a machine of the character described, a die and a mallet relatively movable toward and from each other to force the sheet material upon the cutting edge of the die, means for feeding sheet material into position between the die and the mallet, and a presser foot for clamping the material upon the die, the presser foot being controlled by the feeding means so that the former is tripped to clamp the material at the instant it is released by the feeding means.

100. In a machine of the character described, a die and a mallet relatively movable toward and from each other to force sheet material upon the cutting edge of the die, a presser foot for clamping the material over the die, and a feeding means for moving the material into position between the mallet and the die and operative also to trip the presser foot as the material is released by the feeding means.

101. In a machine of the character described, a die and a mallet relatively movable to force sheet material upon the cutting edge of the die, means comprising a pointed member for holding the sheet material in proper relation to the die, and feeding means for moving sheet material to the described position operative also to control the pointed member so that the latter engages the material before the feeding member retreats from its position over the die.

102. In a machine of the character described, a magazine for sheet material, a feeding member for engaging the rear end of the lowermost sheet to project the other end of the sheet from the magazine, and means for rendering the feeding member inoperative so that the latter will not engage a sheet during a predetermined number of cycles of the machine.

103. In a machine of the character described, a magazine for sheet material, a feeding member for projecting the lowermost sheet with its advance and extending from the magazine, means for reciprocating the feeding member, and means for controlling the feeding member independently of the reciprocating means.

104. In a machine of the character described, a magazine for sheet material, a feeding member reciprocable along the floor of the magazine to engage the rear end of the lowermost sheet to project the advance end of the sheet from the magazine, and a cam member rotatable upon each reciprocation of the feeding member to render the latter inoperative for a predetermined number of reciprocations and to restore it to operative condition for the feeding of a sheet from the magazine.

105. In a machine of the character described, a magazine for sheet material, a member reciprocable along the floor of the magazine to engage the rear end of the lowermost sheet to project the advance end of the sheet from the magazine, a cam member rotatable upon each reciprocation of the feeding member and operative to control the feeding member, and means for adjusting the feeding member so as to project sheets of material various selected distances from the magazine.

106. In a machine of the character described, means for cutting sections from sheet material, a plurality of dies for operating consecutively on the material of each section, and feed members movable simultaneously in opposite directions for moving sheet material of the sections into position over the dies.

107. In a machine of the character described, means for cutting sections of a predetermined size from sheet material, a plurality of dies for operating successively on the material of each section to produce as many blanks therefrom as there are dies with a minimum of waste, feeding means operable for positioning the material of the sections in dieing out relation with respect to the dies, and means for causing simultaneous operation of the dies.

108. In a machine of the character described, a plurality of dies, means for moving sheet material in opposite directions into position over the dies to have blanks cut therefrom, said sheet moving means operating in planes one above the other, and means for causing simultaneous operation of the dies.

109. In a machine of the character described, a plurality of dies for operating to cut blanks successively from the same piece of sheet material, a feed member for moving sheet material into dieing-out relation to one of the dies, a second feed member for simultaneously moving sheet material into dieing-out relation to a second die, and means for causing simultaneous operation of the dies.

110. In a machine of the character described, a plurality of dies operable to cut blanks successively from the same piece of sheet material, a feed member for moving sheet material into dieing-out relation to one of the dies, a second feed member for simultaneously moving sheet material in an opposite direction into dieing-out relation to a second die, and means for causing simultaneous operation of the dies.

111. In a machine of the character described, a plurality of dies, mallets for forcing the material upon the dies, feeding means for positioning sheet material over the dies, and means associated with each die for holding the material in the position to which it has been advanced by the feeding means as the feeding means releases the material prior to an operation of the mallets.

112. In a machine of the character described, a plurality of dies, a mallet for forcing the material upon the dies, a feeding means for each die for positioning sheet material over the die, and means associated with each die and feeding means and arranged to be controlled by the feeding means for holding the material, in the position to which it has been advanced by the feeding means, while the latter releases the material prior to the operation of the mallet.

113. In a machine of the character described, a plurality of dies, a mallet for forcing the material simultaneously upon the cutting edges of the dies, reciprocable feeding members movable in opposite directions to present sheet material in dieing-out position with respect to both dies, sheet holding means associated with each die for holding the material in the position to which it has been advanced by the feeding members and operative while the material is being released by the feeding members prior to the operation of the mallet.

114. In a machine of the character described, a die and a mallet relatively movable to force sheet material upon the cutting edge of the die, a presser foot associated with the mallet for clamping the material upon the die prior to the operation of the mallet, and a member operative to hold the material on the die as the mallet moves away therefrom.

115. In a machine of the character described, a die and a mallet relatively movable to force sheet material upon the die, said mallet having a recess in its operative face, a presser foot for clamping the material upon the die prior to the operation of the mallet and arranged to fill the recess so that the mallet and the presser foot present a smooth surface effective to force the material upon the cutting edge of the die, and a plunger in the mallet operative to hold the material on the die as the mallet moves away.

116. In a machine of the character described, a die and a mallet relatively movable toward and from each other to force sheet material upon the cutting edge of the die, a reciprocable member for feeding sheet material into position between the die and the mallet, a spring-operated presser foot for clamping the material upon the die, means for locking the presser foot in inoperative condition, and means for tripping the locking means of the presser foot just as the feeding means releases the material so that the material is held in proper position for the dieing out operation.

117. In a machine of the character described, a die and a mallet relatively movable toward and from each other to force sheet material upon the cutting edge of the die, a presser foot for clamping the material over the die, a spring for operating the presser foot, a latch for holding the presser foot against the tension of the spring, and a feeding member for moving the material into position between the mallet and the die and operative also to trip the latch of the presser foot as the material is released by the feeding means.

118. In a machine of the character described, a die and a mallet relatively movable to force sheet material upon the cutting edge of the die, means comprising a ball-ended member for holding the sheet material in proper relation to the die, a feeding member for moving sheet material to the described position operative also to control the ball-ended member, and means for moving the ball-ended member to strip the material from the feeding member before the latter retreats from its position over the die.

119. In a machine of the character described, a magazine for sheet material, a feeding member for engaging the rear end of the lowermost sheet to project the other end of the sheet from the magazine, means for reciprocating the feeding member, and means for rendering the feeding member inoperative so that the latter will not engage a sheet during a predetermined number of reciprocations.

120. In a machine of the character described, a magazine for sheet material, a feeding member for operating upon the lowermost sheet in the magazine, operating means for the feeding member, and means for controlling the feeding member, so that the latter will engage a sheet a predetermined number of times in a given series of cycles of the machine.

121. In a machine of the character described, a magazine for sheet material, a feeding member reciprocable along the floor of the magazine to engage the rear end of the lowermost sheet to project the advance end of the sheet from the magazine, and a member operated upon each reciprocation of the feeding member to cause operative and inoperative reciprocations of the feeding member in a predetermined ratio.

122. In a machine of the character described, a magazine for sheet material, a member reciprocable along the floor of the magazine to engage the rear end of the lowermost sheet to project the advance end of the sheet from the magazine, and means for adjusting the feeding member so as to project sheets of material various selected distances from the magazine.

123. In a machine of the character described, means for cutting sections from sheet material, means for cutting blanks from the sections, means for feeding the sheet material to the cutting means and the sections to the second cutting means, and means for varying the ratio between the rates of travel of the material to the two cutting means.

124. In a machine of the character described, means for cutting sheet material into sections, means for cutting the sections into blanks, a single means for feeding the sheets to the first cutting means and the sections to the second cutting means, and means for varying the rate of movement of the material to the first cutting means, the said feeding means operating to advance the section to the same position relative to the second cutting means.

125. In a machine of the character described, means for cutting sections from sheet material, a die for cutting blanks from the sections, means for feeding the sheet material to the cutting means and the sections to the die, and means arranged to be set by the operator for increasing the rate of feed of the sheet material to the cutting means and for correspondingly reducing the rate of feeding movement of the section during a part of its travel to the die.

126. In a machine of the character described, means for cutting sheet material into sections, means comprising a die for cutting the sections into blanks, means comprising a cam for feeding the sheet material to the cutting means and the sections to the die, and a second cam arranged to be set by the operator for varying the action of the feed cam.

127. In a machine of the character described, means for cutting sections from sheet material, a die for cutting blanks from the sections, a single means for feeding the material to the cutting means and the sections to the die, said feeding means comprising a work holder, a cam, and a two-part lever, and a second cam for operating on one part of the lever to cause the work holder to move at an increased rate of speed for a part of its travel.

128. In a machine of the character described, means for cutting sections from sheet material, a die for cutting blanks from the sections, means for feeding sheet material to the cutting means and the sections to the die, and a turret provided with a plurality of cams and adjustable for causing variations in the rate of speed of the feeding means whereby longer or shorter sections may be cut from the sheet material and delivered in the same relative position to the die.

129. In a machine of the character described, means for cutting sections from sheet material, a die for cutting blanks from the sections, means for feeding sheet material to the cutting means and the sections to the die comprising a clamping member adapted to seize the forward end of the sheet to move the latter to the cutting means and to carry the severed section to the die, and a device under the control of the operator for causing the clamping member to move at different rates of speed to vary the amount of material cut off from the sheet by the cutting means so that sections of different sizes are produced and carried to the die.

130. In a machine of the character described, means for cutting sheet material into sections, a die for cutting the sections into blanks, a member for feeding the material to the cutting means and for carrying a severed section to the die, a lever for moving the member, a cam for operating the lever, and a plurality of stationary cams, any one of which may be brought into position to act on the lever to modify the movements of the feed member transmitted from the first mentioned cam whereby sections of various lengths may be cut from the sheet material.

131. In a machine of the character described, means for cutting sections from sheet material, a die for cutting blanks from the sections, means comprising a feed member for moving sheet material to the cutting means and the sections to the die, a feed cam, a lever operated by the cam, connections between the lever and the feed member, and a second cam for acting on said connections during the action of the feed cam to determine the movement transmitted from the feed cam to the feed member.

132. In a machine of the character described, means for cutting sections from sheet material, a die for cutting blanks from the sections, a feed member for moving the sheet material to the cutting means and the sections to the die, operating means for the feed member comprising a cam and a lever, connections between the lever and the feed member, and means for operating on the connections so as to increase the rate of speed of the feed member before the operation of the cutting means and decrease it after the operation of the cutting means.

133. In a machine of the character described, means for cutting sections from sheet material, a die for cutting blanks from the sections, a feed member for moving the sheet material to the cutting means and the sections to the die, operating means for the feed member comprising a cam and a lever, connections between the lever and the feed member, and a plurality of cams, any one of which may be selected by the operator for operating on the connections to cause an increased movement of the feed member prior to the operation of the cutting means and to retard the movement of the feed member subsequent to said operation of the cutting means.

134. In a machine of the character described, means for cutting sections from sheet material, a die for cutting blanks from the sections, a work holder for moving the sheet of material to the cutting means and the sections to the die, a feed cam, a lever connected to move the work holder and operated by the cam, and a stationary cam arranged to modify the movement transmitted from the feed cam to the work holder.

135. In a machine of the character described, means for cutting sections from sheet material, a die for cutting blanks from the sections, a single means for feeding the material to the cutting means and the sections to the die, said feeding means comprising a work holder, a cam, and a two-part lever, and a second cam for operating on one part of the lever to cause the work holder to move at a decreased rate of speed for a part of its travel.

136. In a machine of the character described, means for cutting sheet material into sections, means for cutting the sections into blanks, a single means for feeding the sheets to the first cutting means and the sections to the second cutting means, and means for varying the rate of movement of the material to the first cutting means, the said feeding means operating in all cases from one fixed point to another fixed point so that the sum of all feeding movements is invariable.

137. In a machine of the character described, means for feeding sheet material comprising gripper jaws for seizing the material, spring means for closing the jaws, and means controlled by the closing movement of the jaws for pressing the jaws firmly upon the material.

138. In a machine of the character described, a reciprocable member provided with a pair of jaws for feeding sheet material, a latch for holding the jaws open in sheet receiving position, a spring for closing the jaws, a hammer for striking one of the jaws to cause firm engagement of the jaws with the material, and means for causing simultaneously tripping of the movable jaw and of the hammer to insure a firm hold of the jaws upon the material.

139. In a machine of the character described, a reciprocable member provided with relatively movable jaws for seizing sheet material to feed the same, a latch for holding one of the jaws spaced with respect to the other jaw, a hammer, a latch for holding the hammer in latched position, and means for tripping the hammer for operation upon the movable jaw to insure firm clamping of the jaws upon the material.

140. In a machine of the character described, a reciprocable member for feeding sheet material, a pair of jaws carried by said member for gripping the material, a spring for closing the jaws, a latch for holding one of the jaws spaced with respect to the other in position to receive the material at the receiving station, means for tripping the latch to permit closing of the jaws to grip the material, and means at the discharge station for opening the jaws to release the material and to reset the latch.

141. In a machine of the character described, a die, means for forcing sheet material on the die to cut blanks therefrom, the blanks being forced through the die from which they drop by gravity into a space below the die, a feed belt located below the die, and a pusher member co-operating with the belt to stack the blanks as they are successively discharged from the die.

142. In a machine of the character described, a hollow die, means for forcing sheet material upon the cutting edge of the die and the blanks through the die, a continuously-running belt located at the outlet of the die in position to receive the blanks, and a reciprocable pusher co-operating with the belt to stack the blanks upon the belt in overlapping relation to each other.

143. In a machine of the character described, a support for sheet material, a pair of cutters for operating on the material to cut sections therefrom, means for feeding the material from the support to the cutters, and means associated with one of the cutters for removing a scrap piece or remnant at the rear end of the sheet from the path of movement of a succeeding sheet.

144. In a machine of the character described, a pair of cutters, means for feeding sheet material to the cutters to have sections cut therefrom, and piercing means associated with one of the cutters for removing a scrap piece or remnant away from the line of feed of a succeeding sheet of material.

145. In a machine of the character described, a cutter for operating on sheet material to cut sections therefrom, and means movable with the cutter for removing a scrap piece or remnant of the material away from the line of feed of a succeeding sheet of material.

146. In a machine of the character described, a cutter for cutting sections from sheet material and a pair of V-shaped members carried by the cutter for engaging with a scrap piece or remnant at the rear end of the sheet to remove said piece from the line of feed of a succeeding sheet of material.

147. In a machine of the character described, means for cutting sheet material into sections, a die for cutting blanks from the sections, means for feeding the sheet material to the cutting means and the sections to the die, and means for disposing of the scrap piece or remnant at the rear end of the sheet so that no piece of scrap may be carried to the die.

148. In a machine of the character described, means for cutting sheet material into sections, a die for cutting blanks from the sections, means for feeding the sheet material to the cutting means and the sections to the die, and means associated with the cutting means for removing a scrap piece or remnant at the rear end of the sheet from the line of feed of an incoming sheet of material.

149. In a machine of the character described, means for cutting sheet material into sections, a die for cutting blanks from the sections, means for feeding the sheet material to the cutting means and the sections to the die, and means for disposing of waste material at both the front and rear edges of the sheet of material.

150. In a machine of the character described, means for cutting sheet material into sections, a die for cutting blanks from the sections, means for feeding the sheet material to the cutting means and the sections to the die, and means under the control of the operator for disposing of the waste material at the front end of each sheet thereby insuring that no waste material enters the die.

151. In a machine of the character described, means for cutting sheet material into sections, a die for cutting blanks from the sections, means for feeding the material to the cutting means and the sections to the die, and means for adjusting the feeding means to project the advance end of the sheet a greater or less distance in accordance with the amount of scrap or excess piece at the front end of the sheet to be cut off with the first section, the construction and arrangement being such that the feeding means carries each section through a predetermined distance and into position over the die.

152. In a machine of the character described, means for cutting sheet material into sections, a die for cutting blanks from the sections, and means for feeding the material to the cutting means and the sections to the die, the advance end of the sheet being projected beyond the cutting means a greater or less distance in accordance with the amount of scrap to be cut off with the first section, the construction and arrangement being such that the feeding means carries each section through a predetermined distance and into position over the die where the scrap or excess piece at the front end of the sheet will be disposed of during the dieing-out operation on the first section.

153. In a machine of the character described, cutting means for cutting sheet material into sections, a die for cutting blanks from the sections, the die being located with its far edge always at the same predetermined distance from the cutting means, means having a movement invariable in extent for feeding the sheet material to the cutting means and the sections to the die, and means for projecting each sheet in turn into a predetermined relation to the cutting means and to the first-mentioned feeding means, the projection of the sheet with respect to the cutting means being arranged to dispose whatever there may be of scrap piece or remnant at the front end of the sheet so that it will be cut off with the first section as the latter is operated upon by the die.

154. In a machine of he character described, a support for sheet material, a cutting means for cutting the sheet material into sections, reciprocable means for feeding the sheets to the cutting means, and means for enabling the operator to determine the ratio of operative and inoperative movements of said reciprocable means whereby sheets are moved to the cutting means only at predetermined intervals.

155. In a machine of the character described, means for cutting sheet material into sections, a die for cutting blanks from the sections, means for feeding the sheet material to the cutting means and the sections to the die, said feeding means having a movement invariable in extent, a preliminary feed mechanism for advancing each sheet in turn to the cutting means, said feed mechanism being adjustable to vary the size of the first section cut off by the cutting means, and means under the control of the operator for varying the rate of speed of the feeding means during the feeding of the sheet material to the cutting means to produce longer or shorter sections in accordance with the size of the die selected to cut blanks from the sections.

156. In a machine of the character described, means for cutting sections from sheet material, a pair of dies for cutting the sheet material into blanks, a single feeding means for moving the sheet material to the cutting means and the sections to one of the dies, a separate feeding means for moving the remainder of each section after operation of the first die to the second die, and a preliminary feeding mechanism for advancing each sheet into predetermined relation to the first-mentioned feeding means and to the cutting means, the first-mentioned feeding means having a feeding movement invariable in extent whereby the sections are positioned over the first die in predetermined relation thereto.

157. In a machine of the character described, a support for sheet material, means for cutting the sheet material into sections, a reciprocable feeder member for moving sheet material to the cutting means, said member being constantly reciprocated toward and from the cutting means, and means for automatically projecting the feeder member intermittently into the plane of the lowermost sheet or sheets on the support thereby to feed material from the support once for each given number of reciprocations of the feeder member.

158. In a machine of the character described, a support for sheet material, means for cutting the sheet material into sections, a reciprocable feeder member for projecting sheet material toward the cutting means, said member being constantly reciprocated beneath the support, and a cam under the control of the operator for automatically projecting the feeder member intermittently into the plane of the lowermost sheet and for lowering it from said plane whereby the said feeder is operative but once in a given number of reciprocations thereof.

159. In a machine of the character described, a support for sheet material, means for cutting the sheet material into sections, a reciprocable feeder member for projecting sheet material toward the cutting means, said member being constantly reciprocated beneath the support, and means under the control of the operator for automatically projecting the feeder member into the plane of the lowermost sheet and for permitting it to withdraw from said plane whereby the said feeder member is operative but once in a given number of reciprocations thereof.

160. In a machine of the character described, a support for sheet material, means intermittently operative for cutting sheets of material into sections, feeding means for moving the sheet material step-by-step to the cutting means to have sections cut therefrom, a preliminary feed mechanism for moving the sheet from the support toward the cutting means comprising a feeder member reciprocable along the support, and means for automatically rendering the feeder member operative and inoperative to advance the sheet along the support whereby a sheet is projected toward the cutting means once for a given number of operations of the cutting means so that a fresh sheet is presented to the cutting means and to the first-mentioned feeding means immediately after the preceding sheet has been cut into sections.

161. In a machine of the character described, a support for sheet material, cutting means located at a definite distance from said support for cutting sheets of material into sections, feeding means for moving each sheet step-by-step to the cutting means to have sections cut therefrom, a preliminary feed mechanism for projecting the sheet from the support toward the cutting means comprising a feeder member reciprocable along the support, means for automatically rendering the feeder member operative and inoperative to advance the sheet along the support whereby a fresh sheet is presented to the cutting means and to the first-mentioned feeding means immediately after the preceding sheet has been cut into sections, and means adjustable by the operator for controlling the operation of the automatic means whereby the operator may determine the ratio of the operative to the inoperative movements of the feeder member.

162. In a machine of the character described, a support for sheet material, a cutting means located at a definite distance from said support for cutting sheets of material into sections, a feeding means for moving each sheet step-by-step to the cutting means to have sections cut therefrom, a preliminary feed mechanism for projecting the sheet from the support toward the cutting means comprising a feeder member reciprocable beneath the support, means for automatically rendering the feeder member operative and inoperative to advance the sheet along the support whereby a fresh sheet is presented to the cutting means and to the first-mentioned feeding means only after the preceding sheet has been cut into sections, and a plurality of ratchet wheels adjustable by the operator for determining the operation of the automatic means whereby the operator may determine the ratio of the operative to the inoperative movements of the feeder member.

163. That improvement in methods of cutting sheet material which comprises cutting sections of a predetermined size in succession from sheet material, holding the end of the sheet by a gripping means while each section is severed, and subsequently cutting a plurality of blanks from the sections, while the latter are held under the control of the same gripping means.

164. That improvement in methods of cutting sheet material which comprises cutting a sheet of material into a plurality of sections of predetermined size related definitely to the size of the blank that it is desired to obtain therefrom, the end of the sheet being held by a gripping means which continues to hold the severed section, and subsequently dieing out a blank from each section while it is still under the control of the same gripping means.

165. That improvement in methods of cutting sheet material which comprises cutting a sheet of material into a plurality of sections of a size sufficient for two blanks of irregular shape when arranged so that the larger end of one blank lies in juxtaposition to the smaller end of the other blank, and subsequently cutting the two blanks from each section.

166. That improvement in methods of cutting sheet material which comprises cutting a sheet of material into a plurality of sections of a size sufficient for two blanks of irregular shape when arranged so that the larger end of one blank lies in juxtaposition to the smaller end of the other blank, and subsequently cutting first one blank and then the other from each of the sections.

167. That improvement in methods of cutting blanks of irregular shape from sheet material which comprises cutting a sheet of material into sections of a predetermined size sufficient to produce a plurality of blanks from each section, arranging two or more dies with the large end of one die pointing in the opposite direction from the corresponding end of the juxtaposed die, and placing each section first over one die and then by lateral movement over another die to cut blanks from the sections.

168. That improvement in methods of cutting sheet material into blanks which comprises cutting a sheet into sections of a predetermined size, dieing out a blank from a section thus produced and simultaneously therewith severing the section into two parts, and subsequently dieing out a blank from the part remaining after the first blank is cut from the section.

169. That improvement in cutting sheet material into blanks which comprises cutting a sheet into sections of predetermined size, dieing out from one section a blank and simultaneously therewith severing the section into two parts, one of which has the blank cut therefrom and the other unblanked, placing the unblanked portion over another die and operating both dies to cut blanks simultaneously from two different sections.

170. That improvement in methods of cutting sheet material which comprises cutting a blank from a section of material of predetermined size and simultaneously therewith severing the section to provide material for another blank, and subsequently dieing out a blank from the remainder of the section thus provided.

171. That improvement in methods of cutting sheet material which comprises forcing a section of material upon the cutting edge of a die to such an extent that the material is cut part way only through the thickness thereof, placing a second section on top of the section already on the edge of the die, and forcing the second section upon the edge of the die whereby the cutting of the first section is completed to form a blank, while simultaneously forcing material upon the cutting edge of a second die.

172. That improvement in methods of cutting sheet material which comprises cutting from the forward end of the sheet a section of a size to include a blank and the waste or excess piece of the sheet, cutting from the sheet each remaining section of a predetermined uniform size, and subsequently cutting a blank from each section, the waste or excess piece being disposed of with the scrap from the first section.

173. That improvement in methods of cutting sheet material which comprises cutting a sheet of material into a plurality of sections of predetermined size related definitely to the size of the blank that it is desired to obtain therefrom, including in the first section cut from the sheet the waste or excess piece of the sheet, and subsequently dieing out a blank from each section, with the result that the waste or excess piece of the sheet is discarded with the scrap from the first section.

174. That improvement in methods of cutting sheet material which comprises cutting a sheet of material into a plurality of sections of a size sufficient for two blanks of irregular shape when arranged so that the larger end of one blank lies in juxtaposition to the smaller end of the other blank, including in the first section cut from the sheet the waste or excess piece of the sheet, and subsequently cutting from each section two blanks and the waste or excess piece from the first blank cut from the first section.

175. In a machine of the character described, a die for cutting blanks from sheet material, a hollow mounting for the die having its upper outlet corresponding closely to that of the die and having a base portion which is of the same size throughout a given series of mountings for dies of different sizes, and positioning means on the frame of the machine for engagement with the base portion of the mounting to locate the same and retain it in operative position.

176. In a machine of the character described, a series of dies for cutting blanks of different sizes from sheet material, a hollow mounting for each die having its upper outlet corresponding closely to that of the die and having a base portion which is of the same size throughout the given series of mountings for dies of different sizes, and positioning means on the frame of the machine for engagement with the base portion of each mounting to locate the same and retain it in operative position.

177. In a machine of the character described, a magazine for sheet material, means for feeding the lowermost sheet from the magazine, means for rendering the feeding means inoperative when the number of sheets in the magazine has been reduced to a predetermined minimum, means for guiding the forward ends of the sheets to the exit opening, and a member for pressing the sheet material upon the floor of the magazine adjacent the guiding means, said member serving also to control the means for rendering the sheet feeding means inoperative.

178. In a machine of the character described, a magazine for sheet material, means for feeding the lowermost sheet from the magazine, means for rendering the sheet feeding means inoperative when the number of sheets in the magazine has been reduced to a predetermined minimum, guiding means for the ends of the sheets to direct the latter to the exit opening of the magazine, said guiding means comprising a flared portion in the floor of the magazine adjacent the exit opening, and a member for pressing the forward ends of the sheets against the floor of the magazine at a point adjacent the guiding means, said member serving also to control the said means for rendering the feeding means inoperative.

179. In a machine of the character described, a magazine for sheet material, means for feeding the lowermost sheet or sheets from the magazine, and means for lifting the sheets so that the feeding means cannot engage therewith to prevent the feeding of sheets from the magazine when the number of sheets therein has been reduced to a predetermined minimum.

180. In a machine of the character described, a magazine for sheet material, means for feeding the lowermost sheet or sheets from the magazine, a member for lifting the rear ends of the sheets, and means controlled by the sheets for operating the lifting member when the sheets in the magazine have been reduced to a predetermined minimum so as to prevent the feeding of sheets by the feeding means.

181. In a machine of the character described, a magazine for sheet material, means for feeding the lowermost sheet or sheets from the magazine, a member operative to lift the rear ends of the sheets in the magazine when the number of sheets therein has been reduced to a predetermined minimum, a member resting on the top of the sheets in the magazine, and connections between the last-mentioned member and the lifting member for operating the latter so that the sheets are lifted away from the feeding means to prevent effective operation of the latter.

182. In a machine of the character described, means for cutting sections from sheet material, means for cutting blanks from the sections, a feeder member for feeding the sheet material to the cutting means and the sections to the second cutting means, and means for accelerating the movement of the feeder member to feed the sheet material to the cutting means and for retarding the rate of feeding movement of the feeder member during feeding of the section to the second cutting means.

183. A series of dies, and holders therefor having each die positioned on its own holder with one of the two longitudinal edges of the die always at the same predetermined distance from one side edge of the holder throughout the series of dies and holders irrespective of the size of the die.

184. In a cutting machine arranged to utilize a pair of dies as cutting means for sheet material, the dies being interchangeable with others throughout a range of sizes, a pair of dies, and means for mounting the dies with their side cutting edges which are the most remote from each other in the two dies located always at the same predetermined distance from each other irrespective of the size of the dies.

In testimony whereof I have signed my name to this specification.

FREDERICK M. FURBER.